(12) United States Patent
Nishikata et al.

(10) Patent No.: US 7,843,584 B2
(45) Date of Patent: Nov. 30, 2010

(54) IMAGE FORMING SYSTEM AND METHOD OF CONTROLLING IMAGE FORMING SYSTEM

(75) Inventors: Akinobu Nishikata, Kashiwa (JP); Naohisa Nagata, Moriya (JP)

(73) Assignee: Canon Kabushiki Kaisha (JP)

( * ) Notice: Subject to any disclaimer, the term of this patent is extended or adjusted under 35 U.S.C. 154(b) by 1046 days.

(21) Appl. No.: 11/469,744

(22) Filed: Sep. 1, 2006

(65) Prior Publication Data

US 2007/0086045 A1 Apr. 19, 2007

(30) Foreign Application Priority Data

Sep. 6, 2005 (JP) ............................ 2005-258305

(51) Int. Cl.
*G06F 1/12* (2006.01)
(52) U.S. Cl. ..................... 358/1.15; 358/400; 358/1.14; 358/442; 399/401; 399/407; 271/9.01; 271/225; 271/258.04
(58) Field of Classification Search ................ 358/1.15, 358/1.7, 1.14, 1.16, 498, 400, 442; 399/401, 399/407, 24, 81, 68, 341, 16, 21; 382/282, 382/304, 308; 709/223, 221, 220; 271/9.01, 271/264, 10.01, 9.02, 225, 256, 258.04
See application file for complete search history.

(56) References Cited

U.S. PATENT DOCUMENTS

| | | | | |
|---|---|---|---|---|
| 5,890,029 | A * | 3/1999 | Hirata et al. .................... 399/8 |
| 6,151,464 | A * | 11/2000 | Nakamura et al. ............ 399/79 |
| 6,483,601 | B1 | 11/2002 | Yoneyama et al. |
| 6,507,716 | B2 * | 1/2003 | Nomura et al. ............... 399/80 |
| 6,590,673 | B2 * | 7/2003 | Kadowaki .................. 358/1.15 |
| 6,594,027 | B1 | 7/2003 | Guillemin et al. |
| 6,912,061 | B1 * | 6/2005 | Ozaki ....................... 358/1.15 |
| 7,092,970 | B2 * | 8/2006 | Shiibashi et al. .................. 1/1 |
| 7,295,334 | B2 * | 11/2007 | Hashimoto et al. ......... 358/1.15 |
| 7,436,552 | B2 * | 10/2008 | Nozato ....................... 358/406 |
| 7,532,352 | B2 * | 5/2009 | Yokoyama ................. 358/1.16 |
| 2003/0095280 | A1 | 5/2003 | Sunada et al. |
| 2004/0153530 | A1 | 8/2004 | Machida |
| 2004/0190057 | A1 * | 9/2004 | Takahashi et al. .......... 358/1.15 |
| 2004/0240835 | A1 | 12/2004 | Kuroda |

(Continued)

FOREIGN PATENT DOCUMENTS

EP 1 531 610 A2 5/2005

(Continued)

OTHER PUBLICATIONS

Search Report issued in the corresponding European application No. 06017321.8-2209 mailed Jun. 1, 2007.

(Continued)

*Primary Examiner*—Negussie Worku
(74) *Attorney, Agent, or Firm*—Rossi, Kimms & McDowell LLP

(57) ABSTRACT

A configuration of an image forming system that includes an image forming apparatus and at least one of a paper feed apparatus and a post-process apparatus is defined based on system configuration information including a combination of identification information for the apparatuses and setting information for the order of arrangement of the apparatuses corresponding to the identification information without using a dedicated line connection.

17 Claims, 18 Drawing Sheets

U.S. PATENT DOCUMENTS

| | | | |
|---|---|---|---|
| 2005/0068547 A1* | 3/2005 | Negishi et al. | 358/1.1 |
| 2005/0088681 A1* | 4/2005 | Hosoda | 358/1.14 |
| 2005/0105129 A1* | 5/2005 | Takahashi | 358/1.15 |
| 2005/0275887 A1* | 12/2005 | Yamanaka | 358/1.15 |
| 2006/0028676 A1* | 2/2006 | Mizude et al. | 358/1.15 |
| 2006/0055960 A1* | 3/2006 | Hirano et al. | 358/1.15 |
| 2006/0170953 A1* | 8/2006 | Okamoto et al. | 358/1.15 |
| 2006/0200420 A1* | 9/2006 | Osada | 705/59 |
| 2006/0227367 A1* | 10/2006 | Kitada | 358/1.15 |
| 2007/0053700 A1* | 3/2007 | Nishikata et al. | 399/21 |
| 2007/0130169 A1* | 6/2007 | Ueda et al. | 707/100 |

FOREIGN PATENT DOCUMENTS

| | | |
|---|---|---|
| JP | 6-219597 A | 8/1994 |
| JP | 8-208104 A | 8/1996 |
| JP | 11-232243 A | 8/1999 |
| JP | 11-352848 A | 12/1999 |
| JP | 2000-335060 A | 12/2000 |
| JP | 2001-096841 A | 4/2001 |
| JP | 2001-337798 A | 12/2001 |
| JP | 2002-139966 A | 5/2002 |
| JP | 2003-112464 A | 4/2003 |
| JP | 2005-195858 A | 7/2005 |
| JP | 2005-206264 A | 8/2005 |

OTHER PUBLICATIONS

Extended European Search Report issued in corresponding European Patent Application No. 08022433.0 dated Aug. 19, 2009.

Notice of Allowance issued in corresponding Korean application No. 9-5-2007-057288957, dated Oct. 26, 2007.

Office Action issued in corresponding Japanese Patent Application No. 2005-258305 dated Nov. 2, 2009.

* cited by examiner

FIG. 8

THE FOLLOWING NODE IDS ARE DETECTED.
SPECIFY THE ORDER OF ARRANGEMENT

| NODE ID | PLACE | | NODE ID | PLACE |
|---|---|---|---|---|
| 1 | 0 | | 51 | 4 |
| 2 | 6 | | 52 | 5 |
| 11 | −1 | | | |
| 12 | −2 | | | |
| 13 | −3 | | | |
| 21 | 1 | | | |
| 22 | 2 | | | |
| 31 | 3 | | | |

THE FOLLOWING NODE IDS ARE DETECTED.
SPECIFY THE ORDER OF ARRANGEMENT

| NODE ID | PLACE | | NODE ID | PLACE |
|---|---|---|---|---|
| 1 | 0 | | 51 | 4 |
| 2 | 6 | | 52 | 5 |
| 11 | −1 | 1001 | 201 | - |
| 12 | −3 | 1002 | 250 | - |
| 13 | −2 | | | |
| 21 | 1 | | | |
| 22 | 2 | | | |
| 31 | 3 | | | |

← →   OK 1003, 1005

IMAGE FORMING SYSTEM AND METHOD OF CONTROLLING IMAGE FORMING SYSTEM

BACKGROUND OF THE INVENTION

1. Field of the Invention

The present invention relates to an image forming system and method of controlling image forming system. In particulars it relates to an image forming system that defines a configuration of an image forming system based on system configuration information including a combination of identification information for apparatuses and setting information for the order of arrangement of the apparatus corresponding to the identification information, and a method of controlling the image forming system.

2. Description of the Related Art

Recently, as the speed and image quality of electrophotographic image forming apparatuses and inkjet printing apparatuses increase, a scheme referred to as print on demand (POD) that can handle a large number of copies and a large amount of jobs has appeared.

According to the POD, in an office environment including an image forming apparatus, and a post-process apparatus having a book binding function and a cutting function and a paper feed apparatus that feeds various types of recording sheets to the image forming apparatus that are connected to the image forming apparatus, a print process and a post process are carried out so that the needs of individual operators are satisfied.

In a conventional image forming system applied to the POD composed of a plurality of apparatuses including an image forming apparatus, a paper feed apparatus and a post-process apparatus, the order of connection and order of arrangement of the apparatuses are defined by a dedicated line interconnecting the apparatuses. Each apparatus transmits or receives data concerning print jobs to or from the other apparatuses by communication through the dedicated line, and a series of print jobs including paper feed, image formation and post process is thereby carried out.

Alternatively, in the image forming system, a post-process apparatus or the like can be newly connected to the network, and the print job can be processed using the function of the post-process apparatus or the like. However, in this case also, a dedicated line connection is required to define the arrangement of the apparatuses in the image forming system (see Japanese Patent Laid-Open Nos. 06-219597 and 11-232243).

In the conventional image forming system, the image forming apparatus, the paper feed apparatus, the post-process apparatus and the like are connected to each other by the dedicated line, so that the configuration of the image forming system and the arrangement of the apparatuses therein are permanently determined. Thus, it is difficult to flexibly change the order of arrangement of the apparatuses in the image forming system or add a new apparatus to the image forming system to conform to usage by individual users (the print type or the content of the post process). In addition, if an apparatus in the image forming system does not operate, for example, if an apparatus is not powered on and does not operate, the entire image forming system fails to perform a predetermined function.

SUMMARY OF THE INVENTION

The present invention has been devised in view of the prior art described above, and an object of the present invention is to provide an image forming technique that enables a configuration of an image forming system to be defined based on system configuration information including a combination of identification information (node IDs) for apparatuses and setting information for the order of arrangement of the apparatuses corresponding to the identification information (node IDs) without using a dedicated line connection.

In addition, an object of the present invention is to provide an image forming technique that defines a system configuration composed of available apparatuses and ensures the operation of the image forming system even in the case where some apparatuses are not powered on at the time of activation of the image forming system and thus not all the apparatuses registered in the system configuration information can be used.

In addition, an object of the present invention is to provide an image forming technique that monitors a change of node IDs on the network after the system is defined and can redefine the system at any time as required, so that even if an apparatus is powered on later, the apparatus powered on later can be added to the image forming system without affecting the apparatuses that are operating in the previously defined system.

In order to attain any of the objects described above, an image forming apparatus and a method of controlling an image forming apparatus according to the present invention are characterized by the features described below.

According to the present invention, the foregoing object is attained by providing an image forming system comprises an image forming apparatus and a sheet processing apparatus attached to the image forming apparatus, the image forming apparatus and the sheet processing apparatus each being capable of being connected to a network, the image forming system comprising:

a storage unit that stores identification information for identifying the sheet processing apparatus connected to the network and information for an order of arrangement of the apparatuses; and a definition unit that defines a system configuration for image formation based on the for a result of communication with the sheet processing apparatus.

According to another aspect of the present invention, the foregoing object is attained by providing a method of controlling an image forming system comprising an image forming apparatus and a sheet processing apparatus attached to the image forming apparatus, the image forming apparatus and the sheet processing apparatus each being connected to a network, the method comprising:

a system configuration registration step of registering, in a storage unit, identification information for identifying the sheet processing apparatuses connected to the network and information for the order of the apparatuses;

a communication step of communicating with the sheet processing apparatus connected to the network; and a definition step of defining the system configuration for image formation based on the information stored in the storage unit and information for the result of communication with the sheet processing apparatus.

According to the present invention, a configuration of an image forming system can be defined based on system configuration information including a combination of identification information for apparatuses and setting information for the order of arrangement of the apparatuses corresponding to the identification information without using a dedicated line connection.

In addition, even in the case where some apparatuses are not powered on at the time of activation of the image forming system, and thus not all the apparatuses registered in the system configuration information can be used, a system configuration composed of available apparatuses can be defined, and the operation of the image forming system can be ensured.

In addition, a change in the identification information on the network can be monitored after the system is defined, and the system can be redefined at any time as required. Thus, even if an apparatus is powered on later, the apparatus powered on later can be added to the image forming system without affecting the apparatuses that are operating in the previously defined system.

Further features of the present invention will become apparent from the following description of exemplary embodiments with reference to the attached drawings.

BRIEF DESCRIPTION OF THE DRAWINGS

FIG. 8 shows a system configuration setting screen (after completion of input);

FIG. 10 shows a system configuration setting screen (at the time of reconfiguration);

FIG. 12 shows a screen displayed when the system is powered on;

DESCRIPTION OF THE EMBODIMENTS

First Embodiment (Connection Configuration of Image Forming System)

Figure 1:
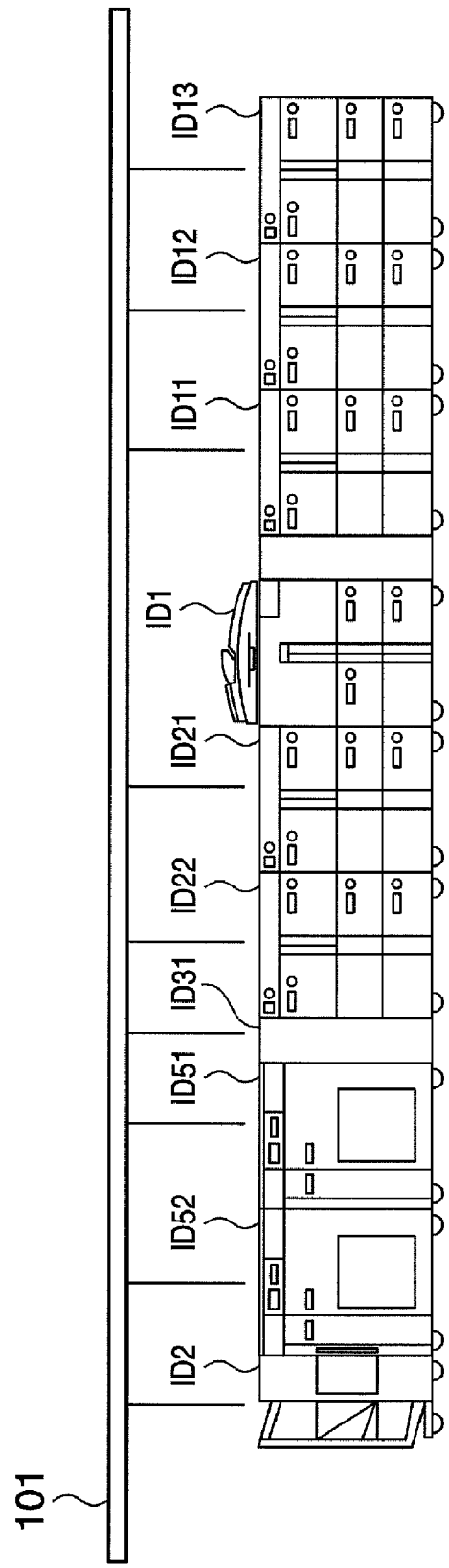
FIG. 1 is a diagram showing a connection configuration of an image forming system according to an embodiment of the present invention.

In the followings a first embodiment of the present invention will be described with reference to the drawings. FIG. 1 is a diagram showing a connection configuration of an image forming system according to this embodiment of the present invention. Referring to FIG. 1, an image forming apparatus (referred to also as "engine" hereinafter" (ID1) that performs image formation on a recording medium including a recording sheet (referred to as "sheet" hereinafter) is disposed at the center. On the upstream side of the engine (ID1) (on the right side in FIG. 1), paper feed decks (ID11, ID12, ID13), which are sheet processing apparatuses that supply sheets to the engine (ID1), are disposed. On the downstream side of the engine (ID1) (on the left side in FIG. 1), inserters (ID21, ID22) for sheet processing are disposed as a paper feed apparatus or post-process apparatus that inserts a cover sheet or inserting paper between sheets with images formed thereon by the engine (ID1).

In addition, on the downstream side of the inserter (ID22) (on the left side in FIG. 1), a puncher (ID31) which is sheet processing is disposed as a post-process apparatus that punches a hole in a sheet carried from the engine (ID1) and the inserters (ID21, ID22). Furthermore, for sheet processing, stackers (ID51, ID52) that store a stack of punched sheets, a finisher (ID2) that performs a post-process such as stapling and sorting, and the like are disposed. The engine (ID1), the paper feed decks (ID1 to ID13), the inserters (ID21, ID22), the puncher (ID31), the stackers (ID51, ID52) and the finisher (ID2) are each connected to each other via a network 101, such as an LAN. Each apparatus has a network identifier (ID) that enables the apparatus to be identified on the network 101. Each apparatus can communicate with the other apparatuses based on a communication system such as Arcnet (registered trademark). Each apparatus (the inserter (ID22), for example) can communicate a command concerning the image formation only with the apparatus immediately upstream thereof (the inserter (ID21)), the apparatus immediately downstream thereof (the puncher (ID31)) and the engine (ID1) but can receive node-ID search information, status information or the like from any apparatus without regard to the node ID of the transmitting apparatus (the engine (ID1), for example).

Figure 2:
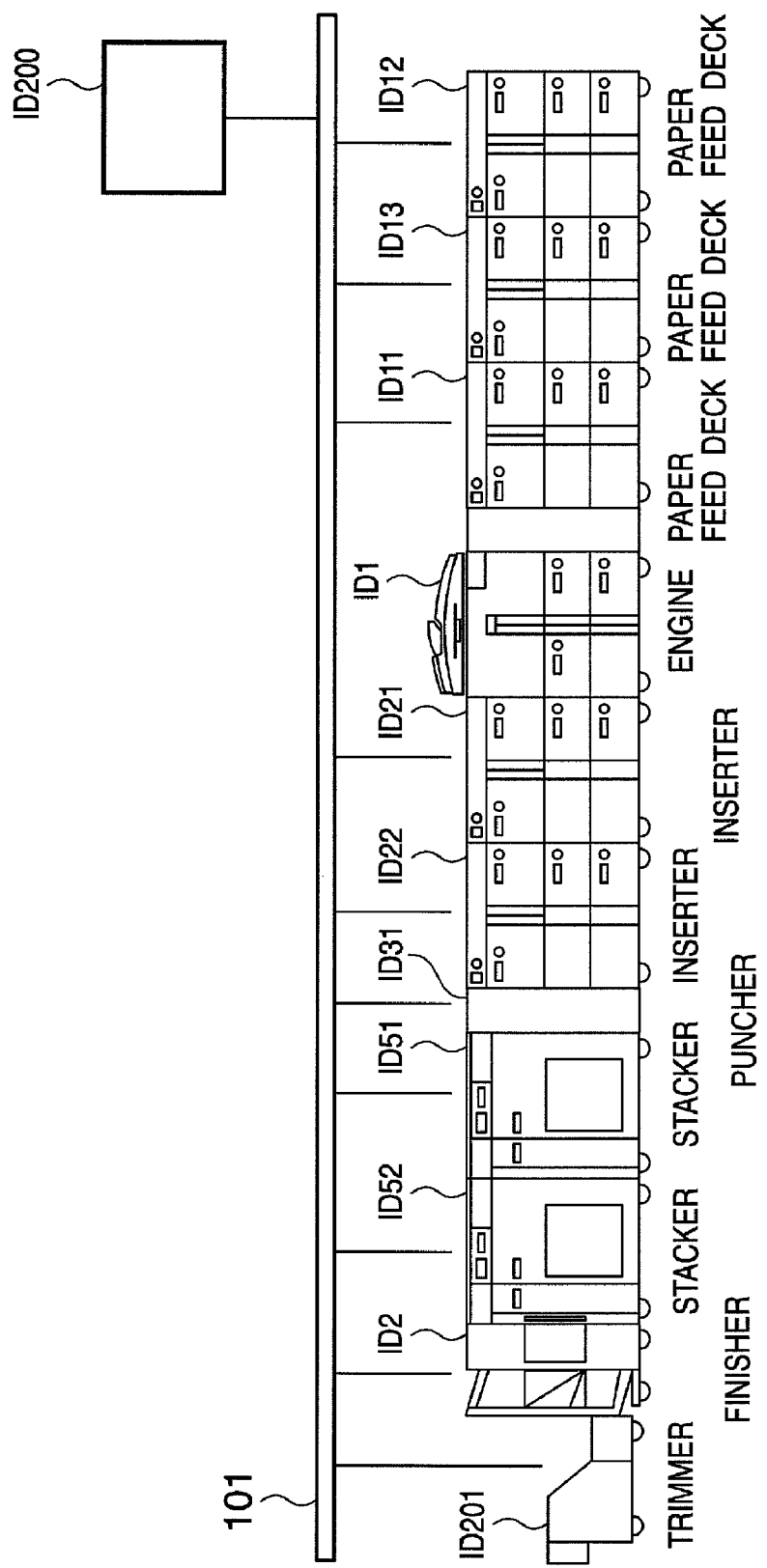
FIG. 2 is a diagram showing a connection configuration of an image forming system provided as a result of rearrangement of the apparatuses of the image forming system and addition of a new apparatus.

FIG. 2 is a diagram showing a connection configuration of an image forming system provided by rearrangement of the image forming system shown in FIG. 1 and addition of a new apparatus.

The image forming system shown in FIG. 2 differs from the image forming system shown in FIG. 1 in that for sheet processing, a trimmer (ID201) that cuts the edges of bundled sheets ejected from the finisher (ID2) is additionally provided on the downstream side of the finisher (ID2) (on the left side in FIG. 2). In addition, the image forming system in FIG. 2 differs from the system in FIG. 1 in that the paper feed decks ID12 and ID13 change places with each other and that an information processing apparatus (ID250) is additionally connected to the system.

The newly connected trimmer (ID201) is also connected to the network 101 and can communicate with the other apparatuses based on the same communication system, such as Arcnet (registered trademark). However, for a command concerning the cutting and status information or the like, the trimmer (ID201) does not communicate directly with the engine (ID1) but communicate with the apparatus immediately upstream thereof (the finisher (ID2)) on a one-to-one basis. Therefore, viewed from the engine (ID1), the trimmer (ID201) is recognized as an optional function of the finisher (ID2). However, the trimmer (ID201) can receive the communication from the engine (ID1) when the engine (ID1) searches for the node ID.

The communication system used in the present invention is not limited to Arcnet (registered trademark), and any communication protocol using other telecommunications lines may be used.

(Configuration of Control Unit)

Figure 3A:
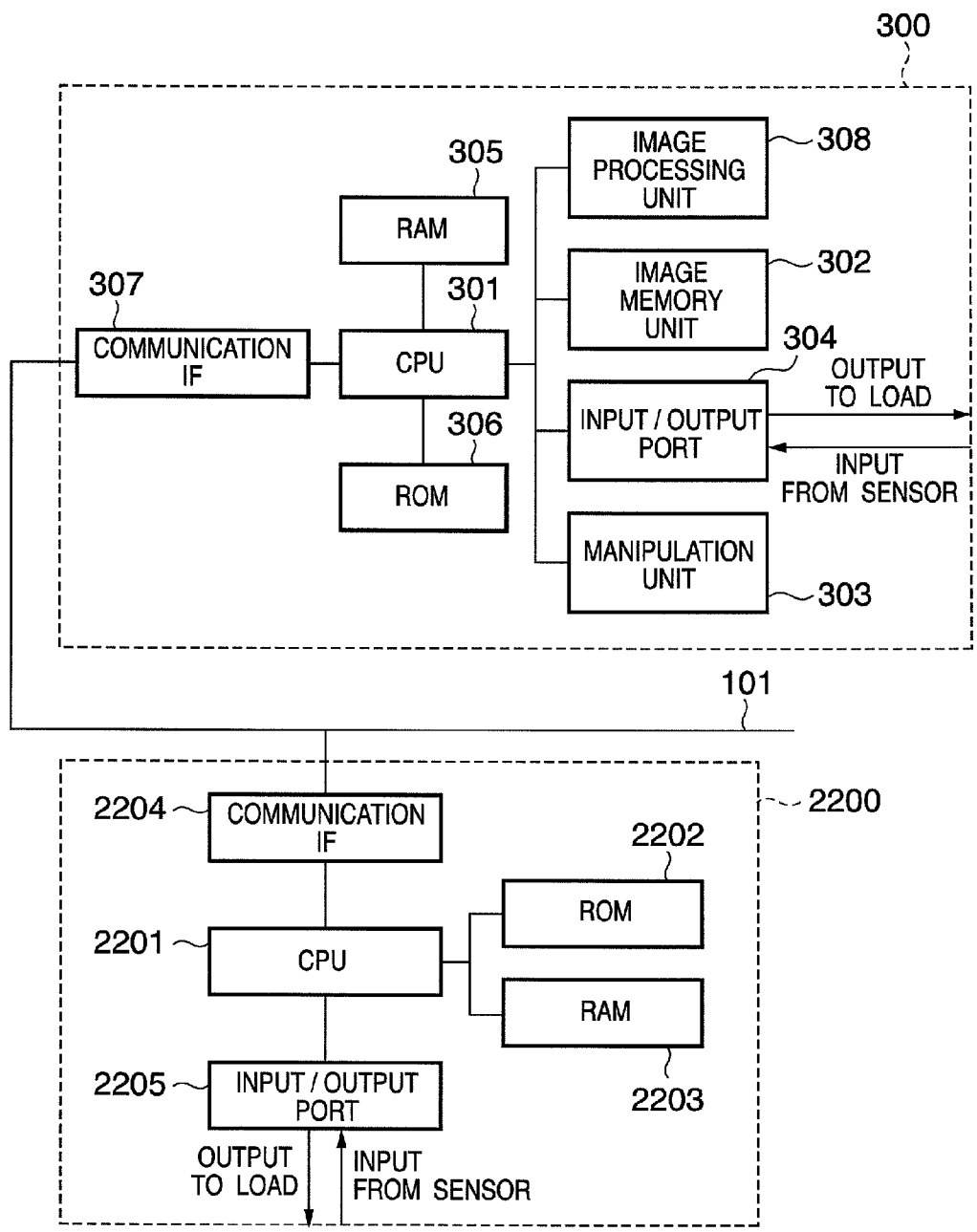
FIG. 3A is a block diagram showing a configuration of a control unit of an image forming apparatus and a configuration of a control unit of another apparatus existing on a network.

FIG. 3A is a block diagram showing a configuration of a control unit of an image forming apparatus (engine (ID1)) 300 and a configuration of a control unit of another apparatus 2200 connected to the network 101 (referred to as "network apparatus" hereinafter), such as the paper feed apparatuses (ID11, ID12, ID13) and the finisher (ID2).

In FIG. 3A, reference numeral 301 denotes a CPU that performs a basic control of the image forming apparatus 300, and reference numeral 306 denotes an ROM in which a control program 350 and an application program 353 (see FIG. 3B) are written. Reference numeral 305 denotes an RAM that serves as a work area for executing processings of the control program. A region of the RAM 305 serves as a backup RAM, the data in which is not erased after the image forming apparatus 300 is powered off.

An input/output port 304 is connected to an address bus and a data bus and allows output of control signals to various load devices, such as a motor and a clutch, controlled by the CPU 301 of the image forming apparatus 300 and input of a sensor signal from a sensor that detects the position of a sheet or the like. The CPU 301 can control the various load devices, such as a motor and a clutch, via the input-output port 304 in accordance with the content of the control program stored in the ROM 306, thereby administering the performance of the image formation.

In addition, the CPU 301 is connected to a manipulation unit 303 and controls the display and key input on the manipulation unit 303. A user can instruct the CPU 301 to change the operation mode of the image forming apparatus 300 or the display on the manipulation unit 303 by key input. In addition, the CPU 301 can control a display unit of the manipulation unit 303 to make it display the operational state of the image forming apparatus 300 or the operation mode set by key input.

Instead of key input, the user can set the operation mode or the like of the image forming apparatus 300 from the information processing apparatus (ID200). Based on the setting performed on the information processing apparatus (ID200), the CPU 301 controls the performance of the image forming apparatus and a processing concerning the definition of the image forming system according to this embodiment.

Furthermore, an image processing unit 308 that processes an electric signal converted from an image signal and an image memory unit 302 that stores a processed image are connected to the CPU 301.

Reference numeral 307 denotes a communication interface (IF) that allows the CPU 301 to communicate with the network apparatus 2200. The CPU 301 can communicate with a CPU 2201 of the network apparatus 2200 via the communication IF 307 of the image forming apparatus 300 and a communication IF 2204 of the network apparatus 2200. When the CPU 301 transmits, to each network apparatus, a signal to request for the node ID of the apparatus, in response to the request, the network apparatus 2200 transmits the node ID ("ID2" in the case the finisher, for example) stored in an ROM 2202 of the apparatus 2200 back to the CPU 301. Thus, the CPU 301 can obtain the node ID of the network apparatus 2200.

Reference numeral 2201 denotes a CPU that performs a basic control of the network apparatus 2200, reference numeral 2202 denotes an ROM in which a control program and a node ID of the apparatus are written, and reference numeral 2203 denotes an RAM that serves as a work area for executing processings of the control program.

An input/output port 2205 is connected to an address bus and a data bus and allows output of control signals to various load devices, such as a motor and a clutch, controlled by the network apparatus 2200 and input of a sensor signal from a sensor that detects the position of a sheet or the like.

The CPU 2201 can control the various load devices, such as a motor and a clutch, via the input-output port 2205, thereby administering the control in accordance with a command from the image forming apparatus 300 (control for performing punching in the case of the puncher (ID31) or control for performing a predetermined post-process or the like in the case of the finisher (ID2), for example).

(Software Configuration of Image Forming Apparatus)

Figure 3B:
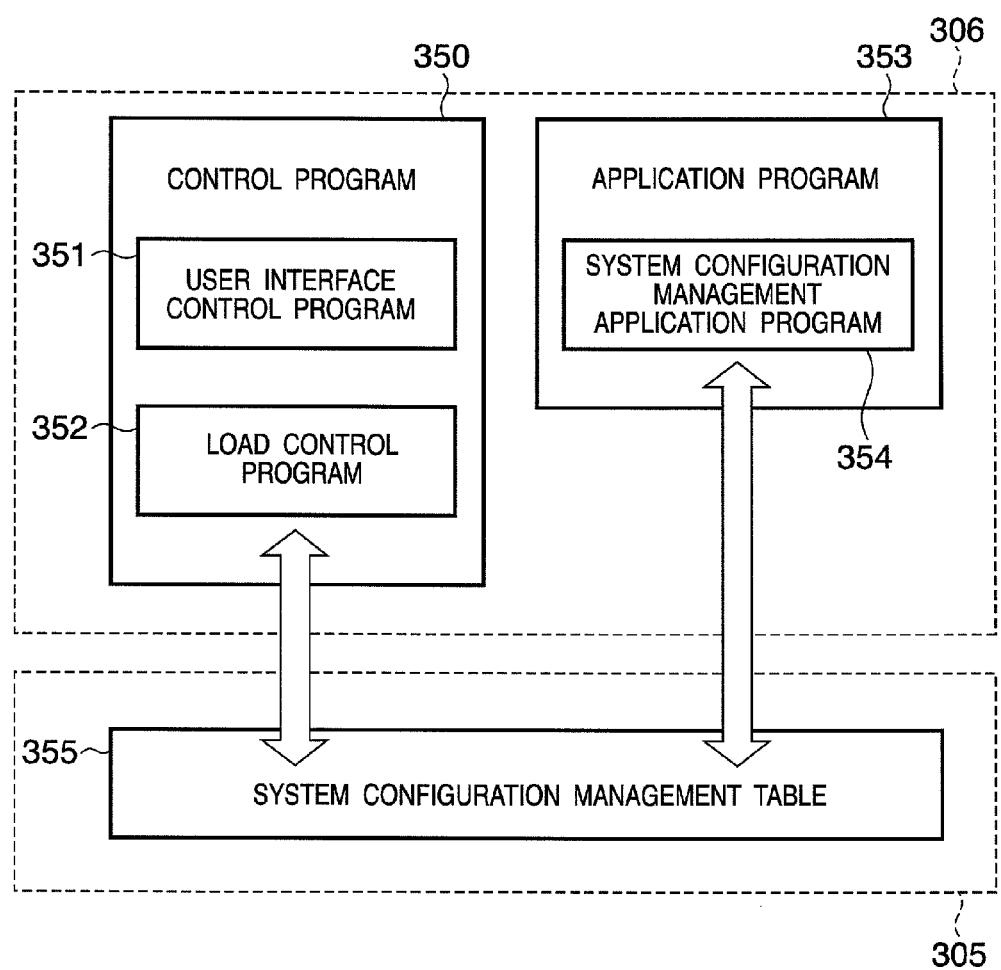
FIG. 3B is a diagram illustrating a configuration of software stored in the image forming apparatus.

FIG. 3B is a diagram illustrating a configuration of software stored in the image forming apparatus 300 (the ROM 306, for example). The storage for the software is not limited to the ROM 306. For example, a non-volatile memory or a secondary storage device, such as a hard disk drive, may be additionally provided in the image forming apparatus 300 to store the program. The software stored in the ROM 306 includes the control program 350 and the application program 353 that can be executed under the control of the CPU 301.

The control program 350 includes a load control program 352 for controlling various load devices, such as a motor and a clutch, in the image forming apparatus 300 and a user interface control program 351 for controlling the display and input concerning system configuration management on the manipulation unit 303.

The application program 353 includes a system configuration management application program 354 for executing processings concerning determination of types and order of arrangement of apparatuses constituting the image forming system, definition of the image forming system and the like.

Under the general control of the CPU 301, the system configuration management application program 354 executes processings concerning generation and transmission of a request for the node ID of each network apparatus 2200 and reception and management of the node ID transmitted from each network apparatus 2200. Based on the node ID received from each network apparatus 2200, the system configuration management application program 354 can register the image forming system having an initial configuration shown in FIG. 1, for example.

When the configuration of the image forming system is changed, the system configuration management application program 354 can modify the registration by registering the changed configuration as an operable system without using a special dedicated line or the like for defining the arrangement of the apparatuses. Thus, the order of arrangement of the apparatuses constituting the image forming system can be flexibly changed.

The same advantage can be provided if the system configuration management application program 354 is not implemented as an application program but implemented as software that serves the function as a part of the control program 350.

In addition, the RAM 305 stores a system configuration management table 355 that contains the node IDs received as a result of execution of the system configuration management application program 354 and the result of management of the node IDs. For example, the system configuration management table 355 can contain combined information (system configuration information) including identification information for the image forming apparatus (ID1), the finisher (ID2), the paper feed decks (ID11, ID12, ID13) and the like (that is, the node IDs thereof) at the time of installation of the image forming system and setting information for the order of arrangement of the apparatuses corresponding to the identification information (node IDs) as initial system configuration information. In addition, the system configuration management application program 354 can modify the setting information for the order of arrangement of the apparatuses of the system configuration information in response to a change of the arrangement of the apparatuses connected to the network.

Under the control of the CPU 301, the user interface control program 351 accesses the system configuration management table 355, makes a liquid crystal display unit 420 of the manipulation unit 303 display information for the types, the order of arrangement or the like of the apparatuses constituting the image forming system, and stores a change of the system configuration in the system configuration management table 355.

The storage for the system configuration management table 355 is not limited to the RAM 305. For example, a non-volatile memory or a secondary storage device, such as a hard disk drive, may be additionally provided in the image forming apparatus 300 to store the system configuration management table 355.

The image forming apparatus (ID1) that communicates with the apparatuses (ID11, 12, 13, ID21, 22, ID31, ID51, ID52, ID2) connected to the network 101 via the communication interface (IF) 307 and defines the system for image formation has a processing unit that registers the system configuration information including a combination of the identification information for identifying each apparatus connected to the network 101 (see 902 and 905 in FIG. 9) and the setting information for the order of arrangement of the apparatuses (see 901 and 904 in FIG. 9, for example) in a storage unit, such as the RAM 305. The processing unit is referred to as system configuration registering unit. Furthermore, the image forming apparatus has a determining unit serving as a processing unit to determine whether an apparatus corresponding to relevant identification information is available or not based on the system configuration information and a defining unit serving as a processing unit to define the system for image formation.

Here, the system configuration management application program 354 described above can function as the system configuration registering unit, the determining unit and the defining unit of the image forming apparatus (ID1) under the control of the CPU 301.

In addition, the image forming apparatus (ID1) has a display control unit to make the liquid crystal display unit 420 display the result of determination by the determining unit. The user interface control program 351 described above can function as the display control unit under the control of the CPU 301.

Figure 4:
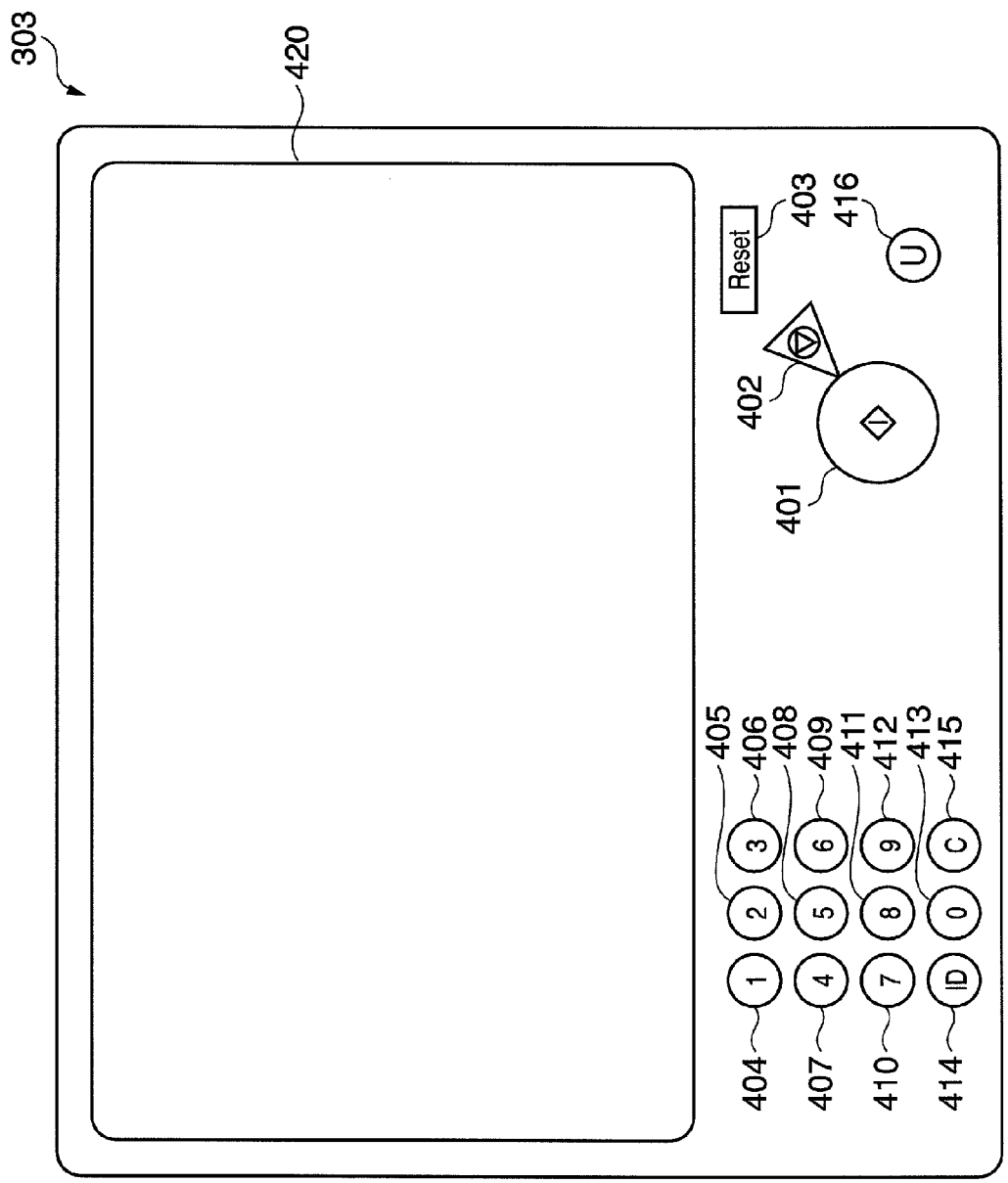
FIG. 4 is a diagram showing a configuration of a manipulation unit of the image forming apparatus.

FIG. 4 is a diagram showing a configuration of the manipulation unit 303 of the image forming apparatus 300. On the manipulation unit 303, a start key 401 to start image formation, a stop key 402 to interrupt image formation, a reset key 403 to restore the display or setting to the initial state, a ten-key pad including keys 404 to 413 for register setting or the like, an ID key 414, a clear key 415 and a user mode key 416 are arranged.

Figure 5:
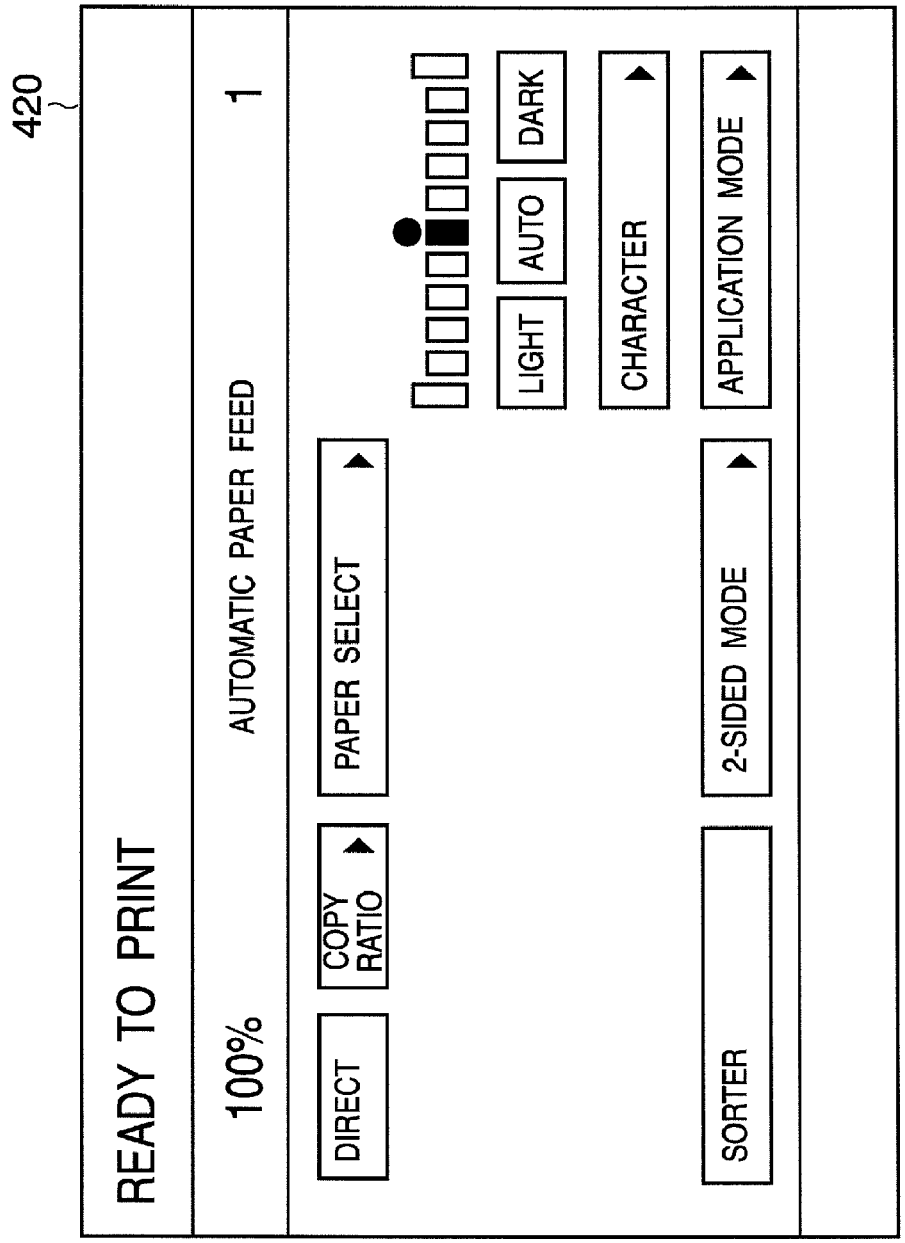
FIG. 5 shows a screen displayed on a liquid crystal display unit.

In addition, the liquid crystal display unit 420, which is a touch panel display, is disposed in the upper area of the manipulation unit 303, and a soft key can be provided on the liquid crystal display screen. Typically, the liquid crystal display unit 420 displays a standard screen as shown in FIG. 5. A user can make manipulations and settings concerning image formation through the screen.

In this image forming system, selections of the print count, the magnification, the single-sided/double-sided mode and the paper feed tray, and settings of the post-process mode including a non-sort mode, a sort mode and a stapling mode and other application modes can be made through input manipulation of the manipulation unit 303. Based on the information input through the manipulation unit 303, the control program 350 can be executed under the control of the CPU 301 to control the image forming apparatus 300.

In addition, the system configuration information indicating the arrangement of the apparatuses of the image forming system can be set through manipulations of the manipulation unit 303. However, it is preferred that this setting manipulation is not open to general users but permitted only to an authorized operator, such as a service person to maintain the image forming apparatus 300 or the image forming system. In this case, the user interface control program 351 authenticates the manipulations made by every operator and permits the setting of the system configuration information only to the operator who is permitted to make manipulations as a result of the authentication.

(Registration of System Configuration)

A processing of registration of apparatuses constituting the image forming system will be described.

Figure 6:
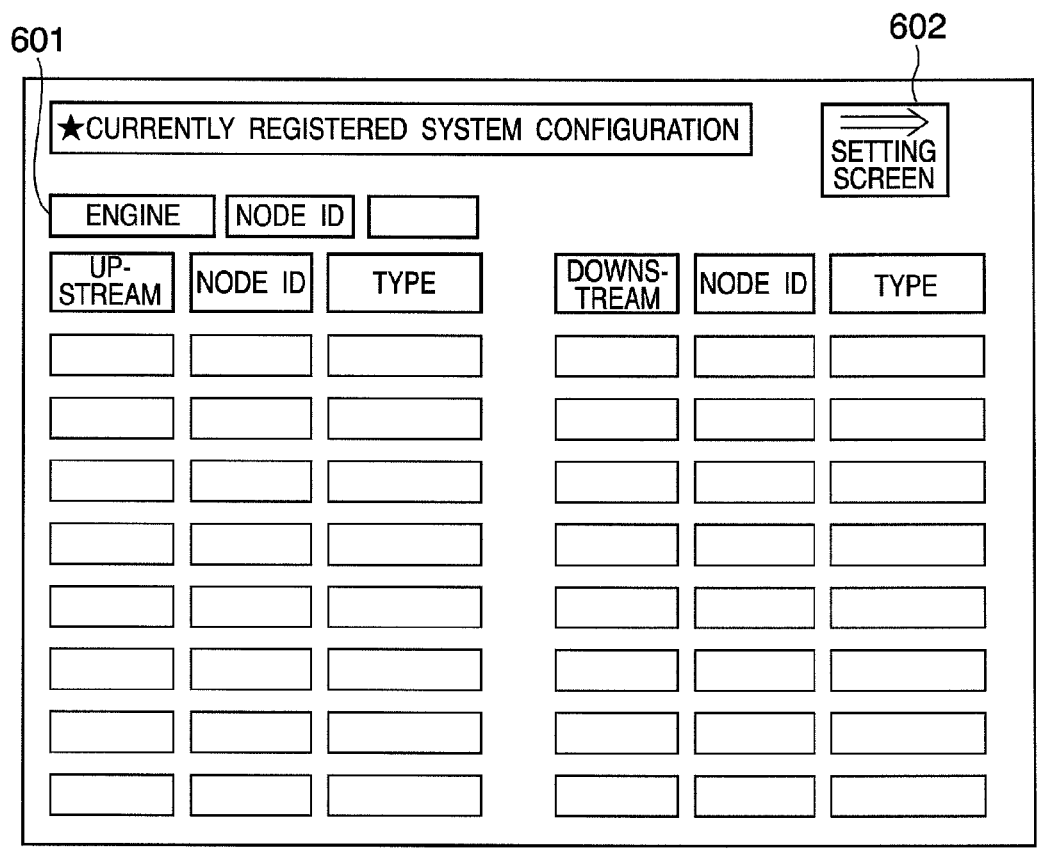
FIG. 6 shows a system configuration display screen (at the time of initial installation)

FIG. 6 shows a screen showing a system configuration currently registered as the image forming system, which is displayed on the liquid crystal display unit 420. In the case of installing a new image forming system having a configuration that has never been registered, or in the case where the system configurations already registered are completely erased, this screen is displayed on the liquid crystal display unit 420 under the display control of the CPU 301 and the user interface control program 351. FIG. 6 shows a state in which only the engine (ID1), which is the image forming apparatus, in the connection configuration shown in FIG. 1 is registered (see reference numeral 601 in FIG. 6). In the image forming system in this state, only the engine (ID1) can operate.

Figure 7:
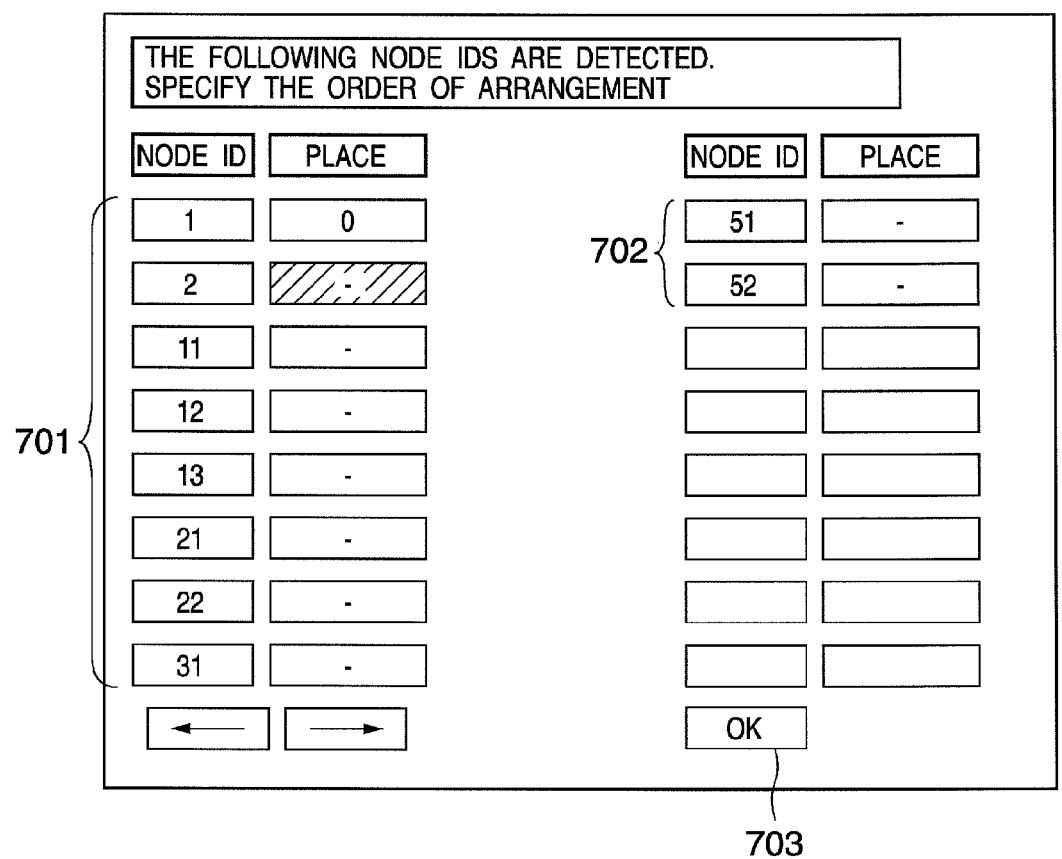
FIG. 7 shows a system configuration setting screen for setting the types and arrangement of apparatuses in the image forming system.

If the user presses a "→ setting screen" key 602 on the screen shown in FIG. 6, the CPU 301 and the user interface control program 351 changes the screen to a system configuration setting screen for setting the types and arrangement of apparatuses in the image forming system as shown in FIG. 7.

Figure 15:
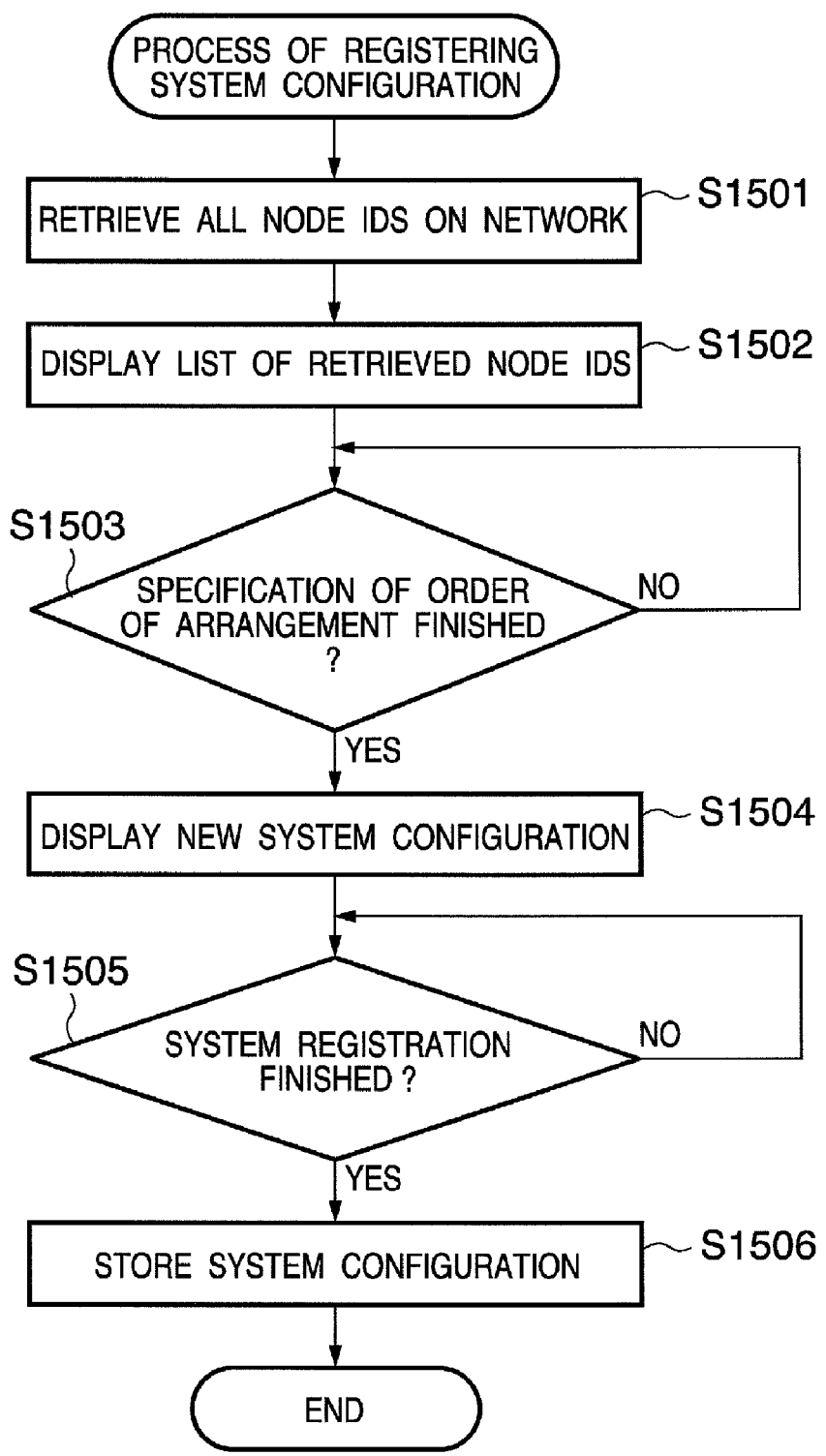
FIG. 15 is a flowchart for illustrating a flow of a process of setting and registering a system configuration.

FIG. 15 is a flowchart for illustrating a flow of a process of setting and registering a system configuration. The registration process starts when the "→setting screen" key 602 described with reference to FIG. 6 is pressed. Under the control of the CPU 301, the user interface control program 351 or the system configuration management application program 354 executes each step of the process.

First, in step S1501, the node IDs of all the apparatuses existing on the network 101 (network apparatuses) are retrieved. The CPU 301 of the image forming apparatus 300 executes the system configuration management application program 354 to communicate with each of the network apparatuses 2200 connected to the network 101 via the communication IF 307, thereby acquiring the node ID of each apparatus.

Then, the process proceeds to step S1502, in which a list of all the node IDs retrieved and acquired in the preceding step S1501 is displayed. FIG. 7 shows a screen in which the list of the retrieved node IDs is displayed, and the list displayed contains the node IDs 1, 2, 11, 12, 13, 21, 22, 31, 51 and 52 (denoted by reference numerals 701 and 702).

After the list is displayed as shown by reference numerals 701 and 702 in FIG. 7, the process proceeds to step S1503, in which the user interface control program 351 accepts specification of the order of arrangement of the apparatuses corresponding to the node IDs by a specific operator, such as a service person, under the control of the CPU 301. The lists 701 and 702 shown in FIG. 7 are displayed until the specification of the order of arrangement is completed. When the specification is completed, and an "OK" key 703 is finally pressed (YES in S1503), the process proceeds to step S1504.

In step S1504, the user interface control program 351 displays the newly set system configuration based on the specification of the order of arrangement of the apparatuses, under the control of the CPU 301 (FIG. 8). FIG. 8 shows a screen additionally showing information for the order of arrangement, that is, information for the order of arrangement of the apparatuses corresponding to the node IDs acquired in step S1501.

The order of arrangement of the apparatuses located upstream of the engine (ID1) (on the right side of the ID1 in the sheet of FIG. 1) is designated by negative numbers (−). The order of arrangement of the apparatuses located downstream of the engine (ID1) (on the left side of the ID1 in the sheet of FIG. 1) is designated by positive numbers (+). The engine (ID1: image forming apparatus 300) is designated as the center of the image forming system, and the place thereof is designated by "0". For example, in the connection configuration of the image forming system shown in FIG. 1, the places of the paper feed decks ID11, ID12 and ID13 located upstream of the engine (ID1) are designated by "−1", "−2" and "−3", respectively. Similarly, the places of the stackers ID51 and ID52 and the finisher ID2 located downstream of the engine (ID1) are designated by "4", "5" and "6", respectively.

Figure 9:
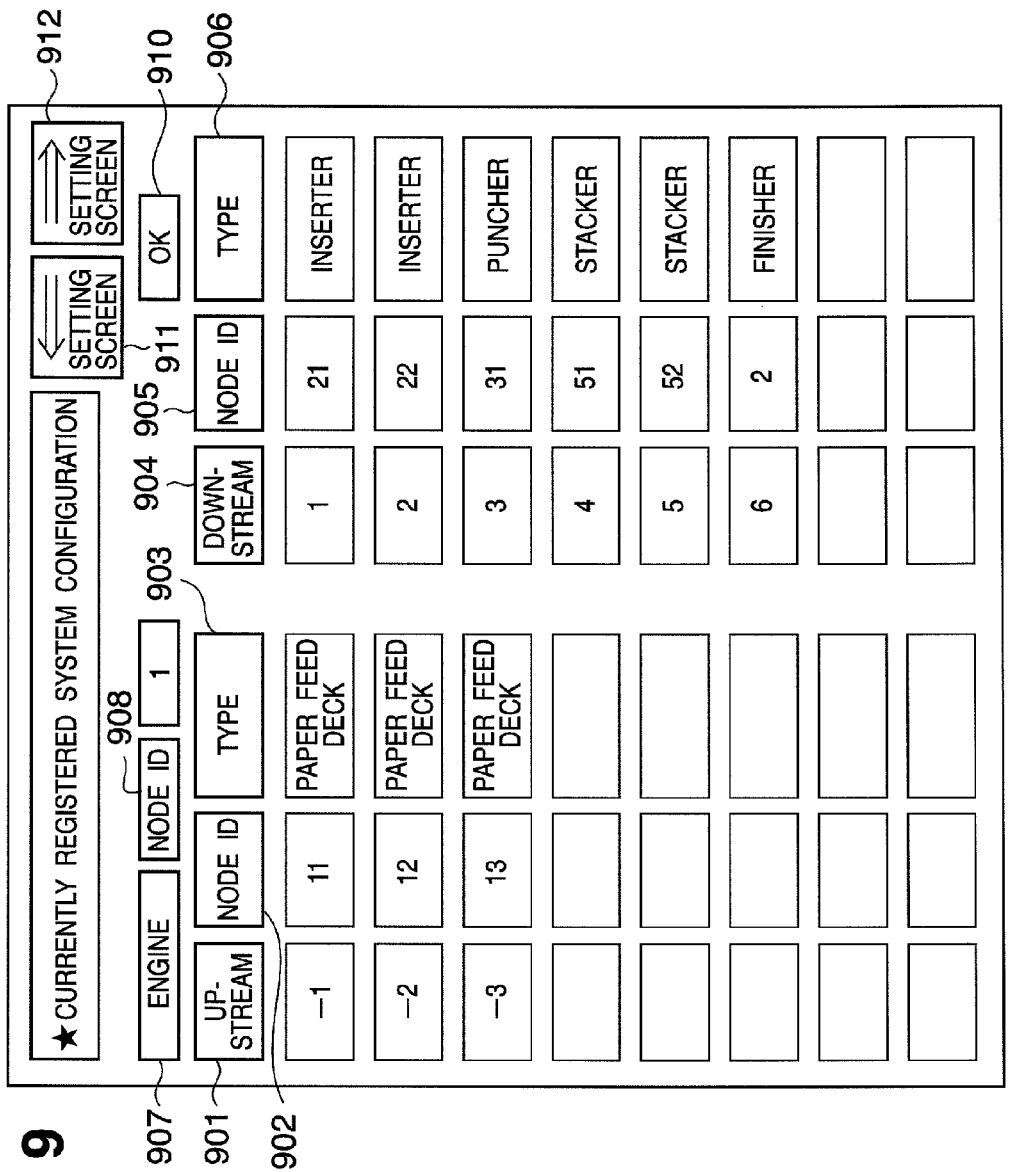
FIG. 9 shows a system configuration setting screen (after completion of setting)

If an "OK" key 801 is pressed on the screen shown in FIG. 8, the user interface control program 351 changes the screen to a screen that displays a system configuration to be registered as the image forming system as shown in FIG. 9, under the control of the CPU 301.

In the screen shown in FIG. 9, an engine 907 is shown as the center of the image forming system, and the node ID 908 of the engine 907 is shown as "1". In a column 901 showing an apparatus located upstream of the engine, a node ID column 902 and a column 903 indicating the type of the corresponding apparatus are shown. In a column 904 showing an apparatus located downstream of the engine, a node ID column 905 and a column 906 indicating the type of the corresponding apparatus are shown.

If the operator presses a "← setting screen" key 911 on this screen, the screen shifts to the screen for specifying the order of arrangement shown in FIG. 8, and the operator can make a setting concerning the arrangement of the apparatuses again. During the setting concerning the arrangement of the apparatuses, the registration of the system configuration is in a suspended state.

In step S1505, completion of the process of registering the system configuration is waited for. Referring to FIG. 9, if the operator presses an "OK" button 910, the process of registering the system configuration is completed (YES in step S1505, and the process proceeds to step S1506. Under the control of the CPU 301, the system configuration management application program 354 stores (registers) the types and the order of arrangement of the set apparatuses, as the system configuration information, in the system configuration management table 355, and ends the process.

(Rearrangement of System Configuration)

Now, there will be described a process that occurs when the order of arrangement of apparatuses in the image forming system described with reference to FIG. 1 is modified and a new apparatus is added to the image forming system as shown in the connection configuration of the image forming system in FIG. 2.

After the order of arrangement of the apparatuses is actually changed, or a new apparatus is actually added to the network 101, if a "→ setting screen" key 912 is pressed on the screen shown in FIG. 9, the system configuration management application program 354 communicates with the network apparatuses 2200 connected to the network 101 to retrieve the node IDs thereof again, under the control of the CPU 301. Then, based on the node IDs acquired as a result of the retrieval, the user interface control program 351 changes the display screen to a system configuration setting screen shown in FIG. 10. In addition to the node IDs of the engine, the paper feed decks, the inserters, the puncher, the stackers and the finisher already registered as the system configuration information, if the node IDs ID201 (corresponding to the trimmer) and ID200 (corresponding to the PC) of other apparatuses shown in FIG. 2 are detected, the user interface control program 351 adds the detected new node ID 201 and ID 250 to the system configuration information and makes the liquid crystal display unit 420 display the new node IDs (see reference numerals 1001 and 1002).

However, since the trimmer, to which the node ID ID201 corresponds, does not communicate the image formation command directly with the engine (ID1), the user interface control program 351 controls the displayed screen to restrict the input of the order of arrangement so that the place of the trimmer cannot be specified. In addition, since the information processing apparatus (ID200) is an apparatus that is not included in the system configuration information for the initial connection configuration (an apparatus outside the image forming system), the input of the order of arrangement is restricted so that the place of the information processing apparatus cannot be specified as with the trimmer (ID201). A symbol "−" shown in order-of-arrangement input columns 1003 for the node IDs ID201 and ID200 indicates that the input of the order of arrangement is restricted so that the places thereof cannot be specified.

Compared with the order of arrangement of the apparatuses in the image forming system shown in FIG. 1, in the image forming system shown in FIG. 2, the places of the paper feed deck (ID12) and the paper feed deck (ID13) are changed with each other. To reflect this change in the system configuration information, in the screen shown in FIG. 10, the place of the node ID ID12 is changed from "−2" to "−3", and the place of the node ID ID13 is changed from "−3" to "−2". After this operation, if the operator presses an "OK" key 1005, the user interface control program 351 makes the liquid crystal display unit 420 display a system configuration display screen shown in FIG. 11, under the control of the CPU 301.

Figure 11:
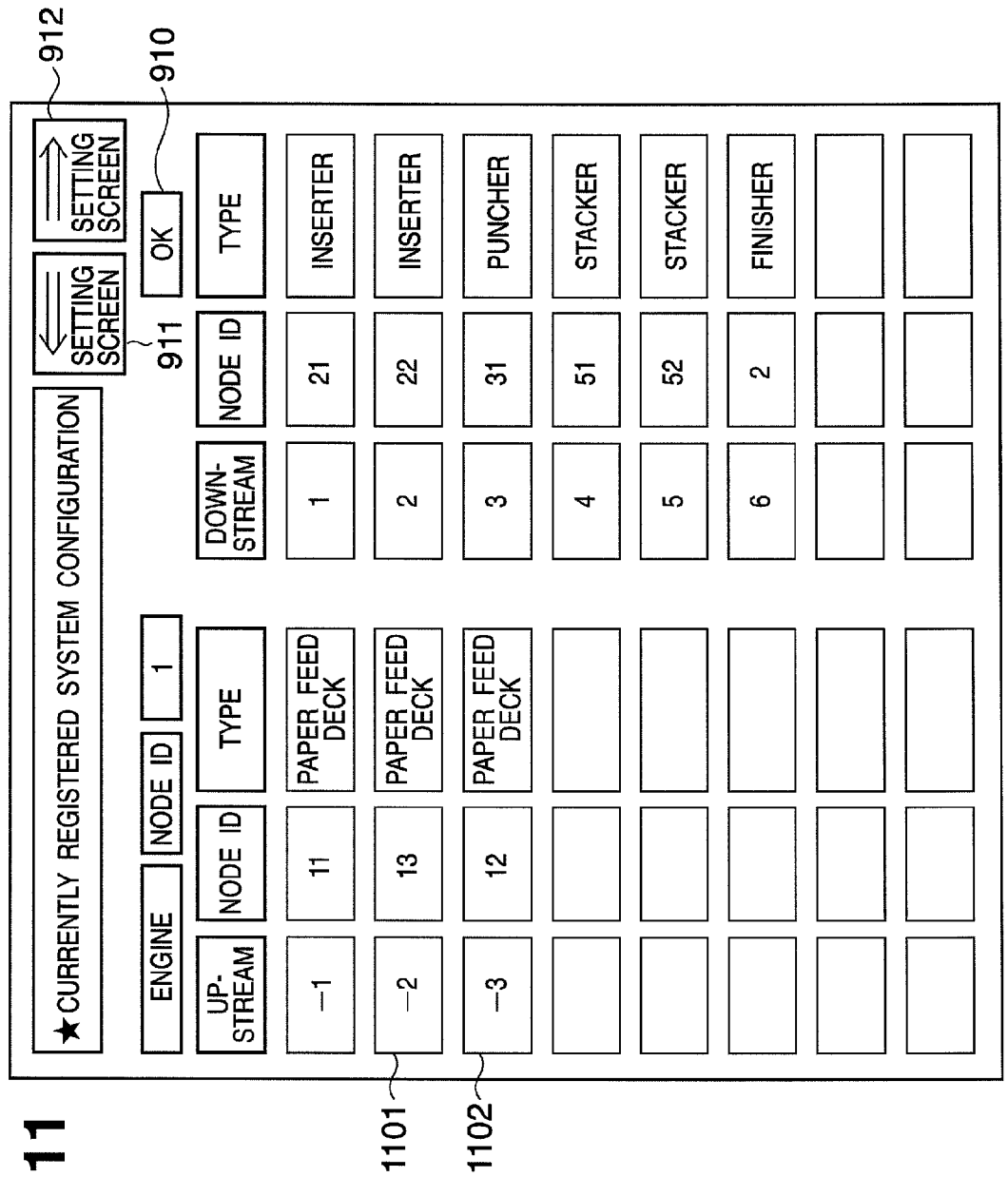
FIG. 11 shows a system configuration setting screen (after completion of reconfiguration)

In the screen shown in FIG. 11, the places of the node IDs ID12 and ID13 are changed with each other (see reference numerals 1101 and 1102), compared with the order of arrangement of the apparatuses of the image forming system in the initial state shown in FIG. 9. In addition, the newly added trimmer (ID201) and PC (ID200) whose node IDs have been detected are not included in the system configuration shown in FIG. 11, because the trimmer and the PC are not registered as the system configuration information of the image forming system.

If the operator presses an "OK" button 910 on the displayed screen shown in FIG. 11, the system configuration management application program 354 stores the newly set system configuration information in the RAM 305 (system configuration management table 355) of the image forming apparatus 300 and ends the process, under the control of the CPU 301.

Through the process described above, the configuration of the image forming system having the image forming apparatus (engine (ID1)) at the center thereof can be flexibly set by acquiring the node IDs of the apparatuses connected to the network and constituting the image forming system and specifying the order of arrangement of the apparatuses corresponding to the acquired node IDs.

(Process Upon Power-On)

Figure 12:
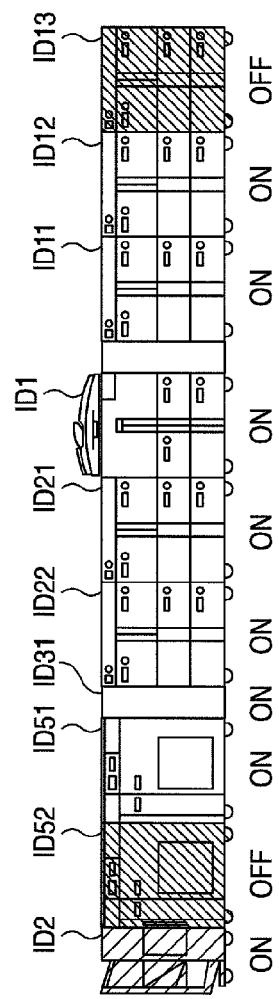
Figure 13:
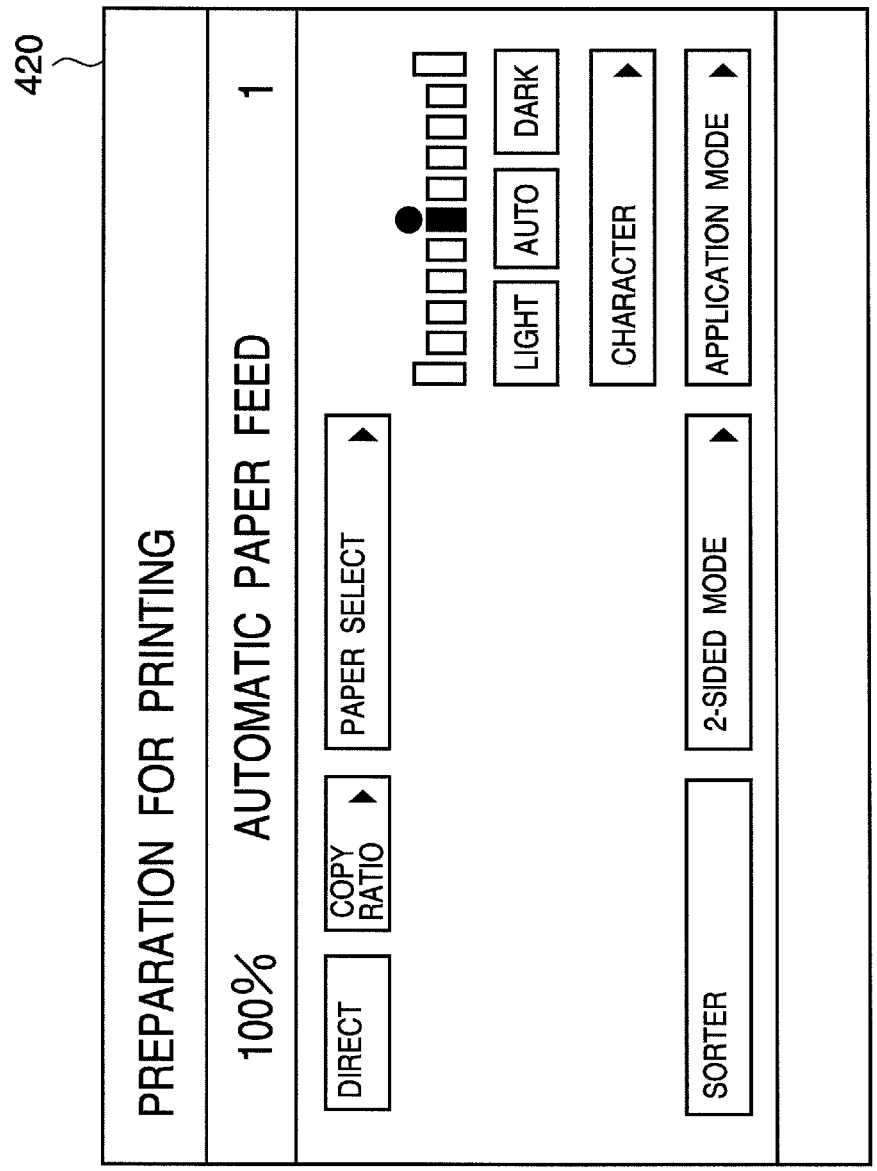
FIG. 13 shows a screen displayed when the system is powered on according to the present invention.

A process that occurs when the system is powered on will be described with reference to FIGS. 12 and 13. It is supposed that each of the apparatuses constituting the image forming system, such as the image forming apparatus, the paper feed apparatus and the post-process apparatus, has a switch (SW) to independently turn on and off the apparatus. FIG. 12 shows a screen showing an apparatus arrangement of the image forming system, which is displayed on the liquid crystal display unit 420 of the image forming apparatus (engine (ID1)) when the system is powered on. This apparatus arrangement is based on the system configuration information stored in the RAM 305, for example, and the user interface control program 351 executes the display control under the control of the CPU 301.

In this drawing, the paper feed deck corresponding to the node ID ID13 and the stacker corresponding to the node ID ID52 are powered off. In FIG. 12, the apparatuses denoted by ID13 and ID52 are shown hatched. In this way, the user interface control program 351 executes the display control so that the apparatuses powered off can be discriminated from the other apparatuses powered on.

As shown in FIG. 12, if the paper feed deck ID13 is powered off, no sheet can be supplied from the paper feed deck (ID13), and if the stacker ID52 is powered off, no sheet can be ejected to the stacker (ID52). Furthermore, although the finisher denoted by the node ID ID2 located further downstream of the powered-off stacker (ID52) viewed from the image forming apparatus (engine (ID1)) is powered on, the finisher is not available in the image forming system, because the stacker (node ID ID52) is powered off, and thus no sheet can be delivered to the finisher. The user interface control program 351 can differentiate the finisher (ID2) in the displayed screen to show that the finisher is not available. In the case shown in FIG. 12, the finisher (ID2) is discriminated by a hatching different from that for the powered-off apparatuses (ID13 and ID52). The other apparatuses that are shown as being powered on (node IDs ID12 to ID51) are available.

In the case where a state in which not all the apparatuses are powered on arises, detecting the powered-off state of some apparatus is not enough to determine whether the state arises because the user has intentionally powered off the apparatus for the purpose of energy saving or because the user has forgot to power on the apparatus. In this case, if an apparatus that is powered off is detected, the user interface control program 351 makes the liquid crystal display unit 420 display a message 1201 shown in FIG. 12 to call user's attention. If the user has forgot to power on the apparatus, the user can check what apparatus should be powered on, because the user interface control program 351 makes the liquid crystal display unit 420 display the message 1201 and display the powered-off apparatuses in a discriminated manner (denoted by the node IDs ID13 and ID52).

On the other hand, if the user has intentionally powered off an apparatus, the operator presses an "OK" key 1202. Then, under the control of the CPU 301, the system configuration management application program 354 defines the arrangement of the apparatuses that are powered on at the time as the image forming system. In this case, the system configuration management application program 354 manages the system configuration so that the image forming system is activated with a configuration (node IDs ID12 to ID51) excluding the powered-off apparatuses ID13 and ID52 and the unavailable apparatus ID2 from the system configuration information registered as the initial state.

On the other hand, if all the apparatuses are powered on when the system is powered on, the operator check process described above is not needed. Therefore, in the case where the image forming system or the system configuration information is modified, the system configuration management application program 354 can activate the image forming system with the modified system configuration in accordance with the system configuration information registered as the initial state. In this case, the user interface control program 351 controls the liquid crystal display unit 420 to display a standard screen for print setting shown in FIG. 13 upon activation of the apparatus. If the image forming apparatus is still in preparation for printing at that time, a message "Preparation for printing" is displayed as shown in FIG. 13.

Once the image forming system excluding the powered-off apparatuses is defined, the image forming apparatus informs all the powered-on apparatuses that the apparatuses can participate in the system and informs any apparatus (the finisher (ID2) in the case shown in FIG. 12, for example) that is unavailable because an apparatus between itself and the engine (the stacker (ID52) in the case shown in FIG. 12, for example) is powered off that the apparatus cannot participate in the system.

Figure 14:
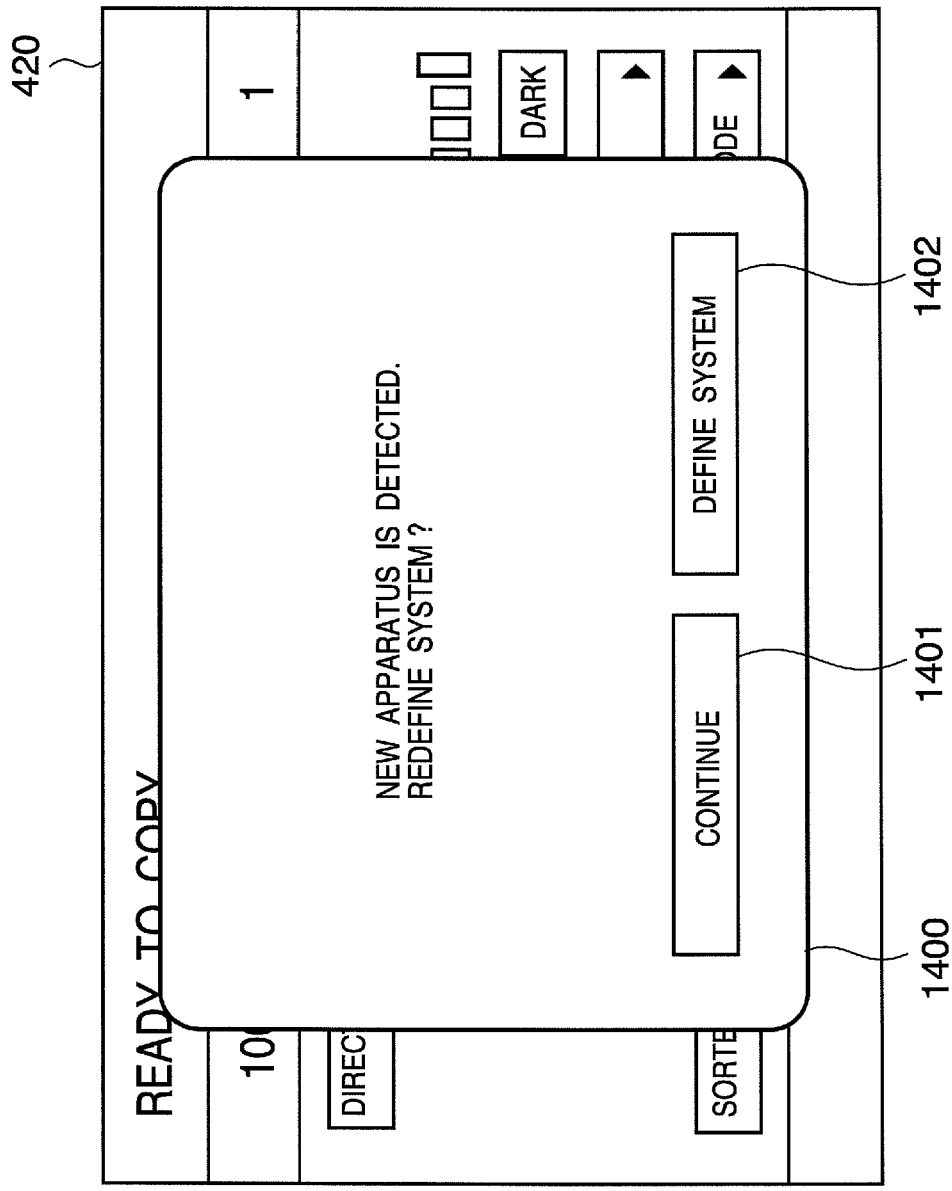
FIG. 14 shows a screen displayed when an apparatus is powered on in the course of operation according to the present invention.

FIG. 14 shows a message screen that is displayed on the liquid crystal display unit 420 under the control of the user interface control program 351 in the case where an apparatus registered as the system configuration information is initially powered off and then powered on during operation of the image forming system. As shown in FIG. 14, the message is displayed in a pop-up window. To continue the process with the currently defined image forming system configuration excluding the powered-off apparatus, the user can press a "continue" key 1401 in the displayed screen. In response to the press on the "continue" key 1401, the user interface control program 351 changes the screen displayed on the liquid crystal display unit 420 to the original standard screen.

On the other hand, to redefine the system including the apparatus newly powered on, the user presses a "system define" key 1402. In response to the press on the "system define" key, the system configuration management application program 354 redefines the configuration of the image forming system including the apparatus newly powered on. At this time, the user interface control program 351 can control the displayed screens shown in FIGS. 12, 13 and 14 based on the power ON/OFF status of each apparatus registered in the system configuration information. If a request for redefinition of the system is input, the system configuration management application program 354 can redefine the configuration of the image forming system including the apparatus newly powered on.

(Process of Defining System Configuration)

Figure 16:
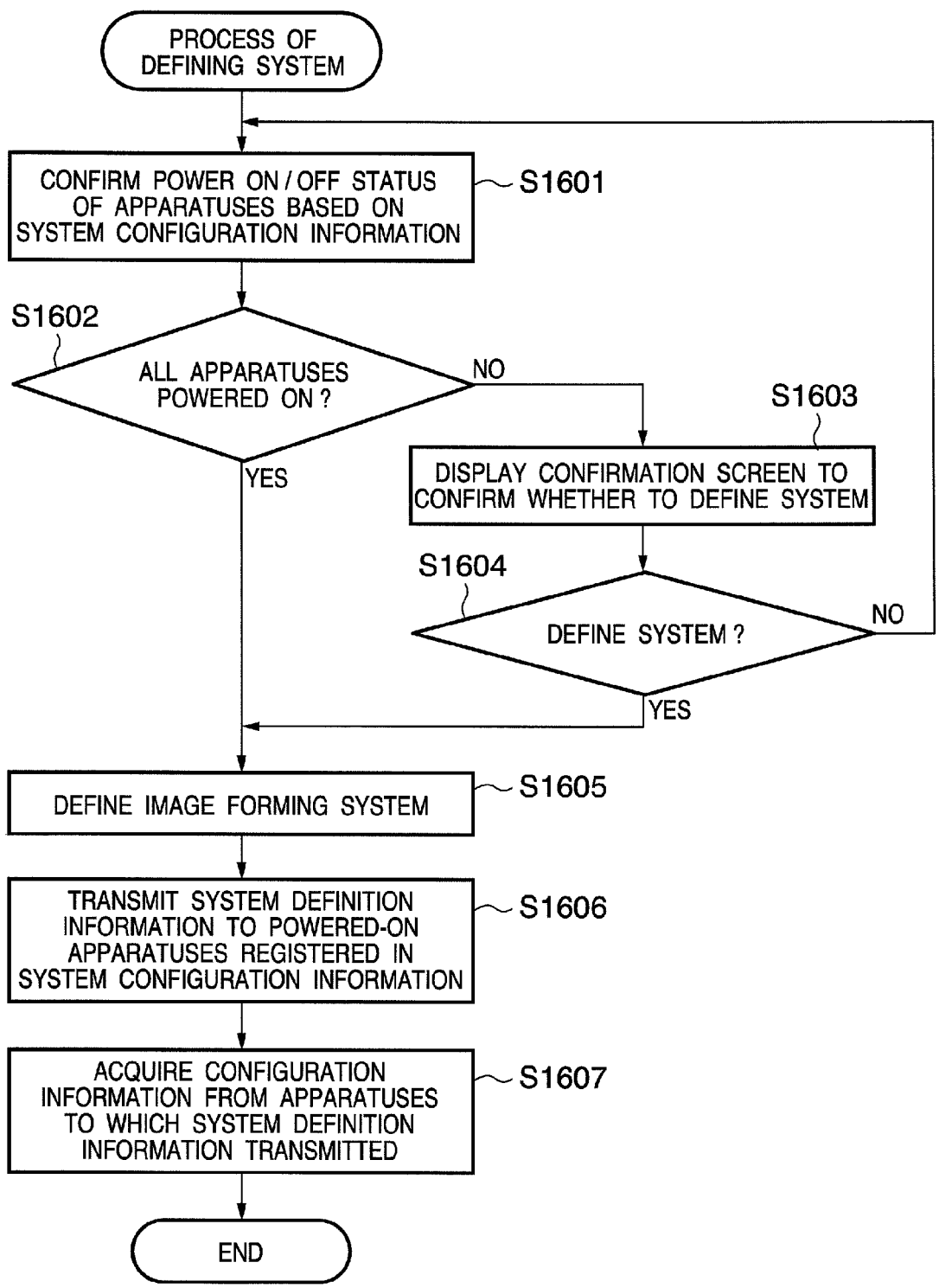
FIG. 16 is a flowchart for illustrating a flow of a process of defining a system configuration.

A flow of a process of defining a system configuration will be described. FIG. 16 is a flowchart for illustrating a flow of a process of defining a system configuration. The process of defining a system configuration occurs when the image forming apparatus 300 is powered on, or in the case where, after a system configuration is once defined at the time of power-on, a network apparatus registered in the system configuration information is powered on during operation of the image forming apparatus 300, and the user chooses to perform system redefinition. The process of defining a system configuration is executed by the user interface control program 351 and the system configuration management application program 354 under the control of the CPU 301.

First, in step S1601 in FIG. 16, based on the system configuration information stored in the system configuration management table 355, the CPU 301 confirms the power ON/OFF status of each apparatus registered as the image forming system in the initial state. For example, the power ON/OFF status of a network apparatus 2200 can be confirmed by checking whether the CPU 301 of the image forming apparatus 300 and the CPU 2201 of the network apparatus 2200 can communicate with each other. For example, the CPU 301 checks whether the CPU 301 can communicate with the network apparatuses 2200 at regular intervals. Thus, the CPU 301 can determine that an apparatus initially powered off is newly powered on.

In step S1602, if all the apparatuses registered in the system configuration information are powered on (YES in S1602), the process proceeds to step S1605, where the image forming system is defined based on the registered system configuration information. On the other hand, if it is determined that not all the apparatuses registered in the system configuration information are powered on in step S1602 (NO in S1602), the process proceeds to step S1603.

In step S1603, under the control of the CPU 301, the user interface control program 351 makes the liquid crystal display unit 420 display a confirmation screen to prompt the user to confirm whether to define the system composed of the apparatuses registered in the system configuration information excluding the powered-off apparatus. The screen displayed in this step corresponds to the screen described above with reference to FIG. 12.

In step S1604, if the system is to be defined (YES in S1604), the process proceeds to step S1605, where the system configuration management application program 354 defines the image forming system composed of the apparatuses registered in the system configuration information excluding the powered-off apparatus.

On the other hand, if it is determined in step S1604 that the system is not to be defined (NO in S1604), the process returns to step S1601, and the confirmation of the power ON/OFF status is repeated.

If the image forming system is defined in step S1605, the process proceeds to step S1606, where the image forming apparatus transmits the system definition information to the powered-on apparatuses of the apparatuses registered in the system configuration information under the control of the CPU 301. At the same time, the image forming apparatus informs the unavailable apparatus that the apparatus cannot participate in the system.

In addition, if any apparatus located downstream of the image forming apparatus is powered off and therefore is unavailable, any apparatus located downstream of the powered-off apparatus is also unavailable because of the order of arrangement of the apparatuses constituting the image forming system, and the image forming apparatus informs the apparatus that the apparatus cannot participate in the system.

In this case, the CPU 301 considers the apparatuses located upstream of the powered-off apparatus located downstream of the image forming apparatus 300 as available ones.

Furthermore, if any apparatus located upstream of the image forming apparatus is powered off and therefore is unavailable, any apparatus located upstream of the powered-off apparatus is also unavailable because of the order of arrangement of the apparatuses constituting the image forming system, and the image forming apparatus informs the apparatus that the apparatus cannot participate in the system.

In this case, the CPU 301 considers the apparatuses located downstream of the powered-off apparatus located upstream of the image forming apparatus 300 as available ones.

Then, the process proceeds to step S1607, where the CPU 301 acquires configuration information from the apparatuses to which the system definition information is transmitted (the powered-on apparatuses among the apparatuses registered in the system configuration information). The configuration information includes status information concerning the operation of the apparatus, such as information for whether a basic or optional function of the apparatus is enabled or disabled and door information, and maintenance information. After the configuration information is acquired from all the apparatuses, the process is ended.

In order to reduce the network traffic, of the apparatuses to which the system definition information is transmitted, the apparatus that is informed that it cannot participate in the system (the finisher (ID2) in the case shown in FIG. 12) is preferably excluded from the communication targets after the image forming apparatus (ID1) acquires the configuration information. In this case, in the image forming system, the apparatus that is informed that it cannot participate in the system cannot be used. However, the image forming apparatus (ID1) can perform maintenance, management or the like of the apparatus based on the configuration information.

To carry out image formation, the image forming apparatus (ID1) identifies the basic function of each apparatus and grasps the operational state of and the maintenance information for each apparatus based on the configuration information for all the apparatuses to which the system definition information is transmitted (excluding the apparatus informed that it cannot participate in the system). For example, based on the basic function or the like of each apparatus, the user interface control program 351 can control the displayed interface screen for inputting various possible settings, such as print range, imposing of image data, book binding settings. The image processing unit 308 can carry out a predetermined image processing based on the settings made on the interface screen described above under the control of the CPU 301. In order that the defined image forming system can carry out the processing corresponding to the settings made on the interface screen, the image forming apparatus (ID1) transmits an image formation start command to all the apparatuses to which the system definition information has been transmitted (excluding the apparatus that has been informed that it cannot participate in the system).

Each apparatus having received the system definition information (excluding the apparatus that has been informed that it cannot participate in the system) carries out a predetermined processing in accordance with the image formation start command.

(Process of Monitoring Network)

A process of monitoring a change in connection configuration of the network 101 due to removal (deletion) of an apparatus from the network 101 or addition of a new apparatus thereto will be described with reference to FIG. 17.

Figure 17:
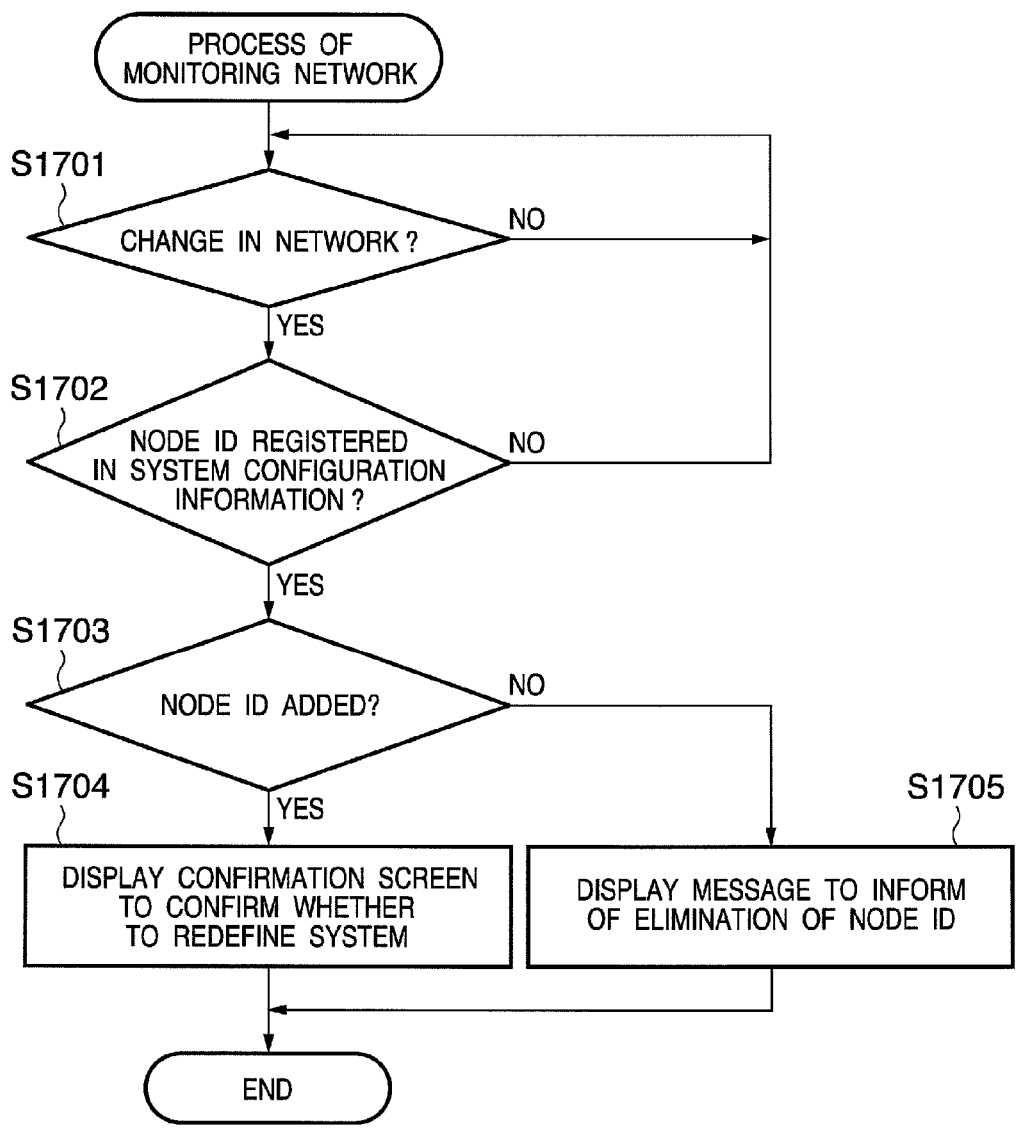
FIG. 17 is a flowchart for illustrating a flow of a process of monitoring the network.

FIG. 17 is a flowchart for illustrating a flow of a process of monitoring a network. This process is carried out by the CPU 301 at regular intervals after the system is defined through the process described above with reference to FIG. 16 in order to monitor a change (addition or deletion) of node IDs on the network 101.

First, in step S1701, the CPU 301 determines whether a node ID on the network 101 is changed or not. If any change is not found (NO in S1701), the process returns to step S1701, and the CPU 301 continues monitoring the network 101 for a change of node IDs.

If it is determined in step S1701 that a node ID on the network 101 is changed (YES in S1701), the process proceeds to step S1702, where the CPU 301 determines whether the changed node ID is a node ID registered in the system configuration information or not. If the changed node ID is not registered in the system configuration information (NO in S1702), the change of the node ID has no effect on the operation of the image forming system. Thus, the process returns to step S1701, and the steps S1701 and S1702 are repeated.

If it is determined in step S1702 that the changed node ID is registered in the system configuration information (YES in S1702), the process proceeds to step S1703.

In step S1703, the CPU 301 determines whether a node ID is added (in the case where an apparatus having been powered off is powered on during operation of the image forming system once defined, for example) or eliminated (in the case where an apparatus having been powered on is powered off). In the case where a node ID is added (YES in S1703), the process proceeds to step S1704, where the user interface control program 351 makes the liquid crystal display unit 420 display the confirmation screen to confirm whether to redefine the system described above with reference to FIG. 14, under the control of the CPU 301.

In the case of redefining the system including the apparatus newly powered on, the user presses the "system define" key 1402, and in response to the press on the "system define" key, the system configuration management application program 354 defines the configuration of the image forming system including the apparatus newly powered on.

If it is determined in step S1703 that a node ID is eliminated (NO in S1703), the process proceeds to step S1705, where the user interface control program 351 makes the liquid crystal display unit 420 provide a warning display (an error message display) to inform that there is a possibility that communication with the image forming apparatus (ID1) may be disabled in the following process and operation of the image forming system may not be ensured.

The process of monitoring the network is not limited to the monitoring for addition of a new apparatus and removal of an apparatus. For example, the network may be monitored for a status change of an apparatus in the image forming system that is initially powered on (activated) and then powered off during operation of the image forming system, thereby determining the available apparatuses to define the image forming system. Alternatively, the network may be monitored for a status change of an apparatus in the image forming system that is initially powered off and then powered on during operation of the image forming system, thereby determining the available apparatuses to define the image forming system.

For example, the CPU 301 detects that an apparatus initially powered off is powered on. In addition, the CPU 301 detects that an apparatus initially powered on is powered off. Thus, the CPU 301 can determine whether each apparatus on the network can communicate with the CPU 301 or not at regular intervals.

As described above, according to this embodiment, the configuration of the image forming system can be defined based on the system configuration information concerning settings of the node IDs and the order of arrangement of apparatuses without using a dedicated line connection.

A change in order of arrangement of the apparatuses constituting the image forming system can be readily reflected in the system configuration information by modifying the content thereof.

In addition, even if not all the apparatuses registered in the system configuration information can be used at the time of activation of the image forming system because some of the apparatuses are not powered on, the system configuration can be defined using the available apparatuses to ensure the operation of the image forming system.

Furthermore, even after the system is once defined, the network can be monitored for a change of node IDs, and the system can be redefined as required. Therefore, even if an apparatus is powered on after the system is defined, the newly powered on apparatus can be added to the image forming system without affecting the apparatuses that are already operating in the defined system.

Other Embodiments

Of course, the object of the present invention can be attained by providing a storage medium (or a recording medium) in which a program code of software to implement the functions according to the embodiment described above is recorded to a system or apparatus and by a computer (CPU or MPU) of the system or apparatus reading out and executing the program code stored in the storage medium.

In this case, the program code itself read from the storage medium implements the functions according to the embodiment described above, and the storage medium storing the program code constitutes a part of the present invention. Of course, the functions according to the embodiment described above is not implemented only by the computer executing the read program code, an operating system (OS) or the like running on the computer may perform part or whole of the actual processings in accordance with the instruction from the program code, thereby implementing the functions according to the embodiment described above.

Furthermore, of course, the program code read from the storage medium may be written to a memory in a feature expansion card inserted in the computer or in a feature expansion unit connected to the computer, and then the CPU or the like of the feature expansion card or feature expansion unit may perform part or whole of the actual processings, thereby implementing the functions according to the embodiment described above.

Exemplary embodiments have been described in detail above. However, for example, the present invention can be implemented in the form of a system, an apparatus, a method, a program, a storage medium or the like. Specifically, the present invention may be applied to a system comprising a plurality of devices or an apparatus constituted by a single device.

According to the present invention, a software program that implements the functions according to the embodiment described above (in the embodiment, the programs corresponding to the flowcharts shown in FIGS. 15 to 17) may be remotely or directly supplied to a system or apparatus, and a computer in the system or apparatus may read and execute the supplied program codes.

Therefore, a program code itself that is installed in the computer to make the computer implement the functions according to the present invention also constitutes a part of the present invention. In other words, the present invention includes a computer program itself for implementing the functions according to the present invention.

In this case, the present invention includes any object code, any program execute by an interpreter, any script data supplied to the OS or the like as far as it functions as a program.

For example, the recording medium for supplying the program may be a floppy (registered trademark) disk, a hard disk, an optical disk, a magneto-optical disk, an MO, a CD-ROM, a CD-R, a CD-RW, a magnetic tape, a non-volatile memory card, an ROM, a DVD (DVD-ROM, DVD-R).

Alternatively, as a method of supplying the program, a web site on the Internet may be accessed using a browser of a host computer, and the computer program itself according to the present invention or a compressed file containing an automatic installation function may be downloaded from the web site into a recording medium, such as a hard disk. Furthermore, the program codes constituting the program according to the present invention may be divided into a plurality of files, and the files may be downloaded from different web sites. In other words, the present invention includes a WWW server that allows a plurality of users to download the program file that makes a computer execute the functions according to the present invention.

Alternatively, the program according to the present invention may be distributed to users after being encrypted and stored in a storage medium, such as a CD-ROM. Then, users who meet a predetermined condition may be permitted to download key information to decrypt the encrypted program from a web site via the Internet and install the program decrypted using the key information in their respective computers to execute the program.

Alternatively, the functions according to the embodiment described above is not implemented only by the computer executing the read program, an OS or the like running on the computer may perform part or whole of the actual processings in accordance with the instruction from the program, thereby implementing the functions according to the embodiment described above.

Alternatively, the program read from the recording medium may be written to a memory in a feature expansion card inserted in the computer or in a feature expansion unit connected to the computer, and then the CPU or the like of the feature expansion card or feature expansion unit may perform part or whole of the actual processings, thereby implementing the functions according to the embodiment described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-258305, filed Sep. 6, 2005, which is hereby incorporated by reference herein in its entirety.

What is claimed is:

1. An image forming system comprising:
   an image forming apparatus; and
   a plurality of sheet processing apparatuses, wherein the image forming apparatus and the sheet processing apparatuses are serially attached in a serial arrangement, wherein said image forming apparatus and said sheet processing apparatuses are each connected to a network, and wherein said image forming apparatus comprises:
   a system configuration registration unit that registers identification information for identifying said sheet processing apparatuses and registers arrangement information regarding an order in which said image forming apparatus and said sheet processing apparatuses are arranged in the serial arrangement;
   a storage unit that stores the identification information and the arrangement information in association with each other; and
   a control unit that sends commands to said sheet processing apparatuses based on the identification information and the arrangement information stored in said storage unit
   wherein said control unit determines that a sheet processing apparatus that is identified by the identification information and that has yet to be powered on is an unavailable apparatus,
   wherein, in the case where said sheet processing apparatus yet to be powered on is located downstream of the image forming apparatus, said control unit determines that a sheet processing apparatus that is (a) identified by the identification information, (b) determined to be powered on, and (c) located downstream of said sheet processing apparatus yet to be powered on is an unavailable apparatus, and
   wherein in the case where said sheet processing apparatus yet to be powered on is located upstream of the image forming apparatus, said control unit determines that a sheet processing apparatus that is (a) identified by the identification information, (b) located downstream of said apparatus, and (c) has yet to be powered on is an available apparatus.

2. The image forming system according to claim 1, wherein, as a sheet processing apparatus connected to the network is changed, said system configuration registration unit reregisters the identification information and the arrangement information to account for the change.

3. The image forming system according to claim 1, wherein said control unit determines whether a sheet processing apparatus identified by the identification information is available or not based on an analysis of the arrangement information and the identification information performed at a predetermined timing.

4. The image forming system according to claim 3, wherein the image forming apparatus further comprises:
   a display control unit that makes a display unit display a result of the determination by said control unit.

5. The image forming system according to claim 4, wherein, in the case where said control unit determines that there is a sheet processing apparatus that is unavailable, said display control unit makes said display unit provide a warning display.

6. The image forming system according to claim 4, wherein said display control unit makes said display unit provide a display of sheet processing apparatuses determined by said control unit to be available sheet processing apparatuses.

7. The image forming system according to claim 3, wherein the image forming apparatus further comprises:
   a communication control unit that controls communication, via the network, with the sheet processing apparatuses identified by the identification information,
   wherein said communication control unit acquires, from sheet processing apparatuses determined to be available by said control unit, information including at least maintenance information for the sheet processing apparatuses and transmits command information for image formation to the sheet processing apparatuses determined to be available.

8. The image forming system according to claim 1, wherein said control unit determines that each sheet processing apparatus identified by the identification information is an available apparatus if the corresponding sheet processing apparatus is not determined to be unavailable apparatus by said control unit.

9. The image forming system according to claim 1,
wherein the image forming apparatus further comprises a display control unit that makes a display unit display a result of the determination by said control unit, and
wherein said display control unit makes said display unit provide a display to prompt power-on of the sheet processing apparatus that has yet to be powered on.

10. The image forming system according to claim 1, wherein the image forming apparatus further comprises:
a monitoring unit that monitors a change in connection configuration of the network due to removal of a sheet processing apparatus from the network or addition of a sheet processing apparatus to the network.

11. The image forming system according to claim 10, wherein, in the case where it is found, as a result of monitoring by said monitoring unit, that a change occurs in the network, said control unit determines whether there is a sheet processing apparatus identified by the identification information that is newly powered on and becomes available.

12. The image forming system according to claim 11,
wherein the image forming apparatus further comprises a display control unit that makes a display unit display a result of the determination by said control unit, and
wherein said display control unit makes said display unit provide a display to confirm whether to reregister the arrangement information of said sheet processing apparatus that is newly powered on and becomes available or to maintain the arrangement information.

13. The image forming system according to claim 12, wherein said system configuration registration unit reregisters the arrangement information of said sheet processing apparatus that is newly powered on and becomes available in the case where it is decided to reregister the arrangement information.

14. The image forming system according to claim 1, wherein the image forming apparatus further comprises:
a receiving unit that receives the identification information through the network.

15. The image forming system according to claim 1, wherein said system configuration registration unit changes the arrangement information corresponding to the identification information in accordance with an indication by an operator.

16. A method of controlling an image forming system comprising an image forming apparatus and a plurality of sheet processing apparatuses, wherein the image forming apparatus and the sheet processing apparatuses are serially attached in a serial arrangement, wherein said image forming apparatus and said sheet processing apparatuses are each connected to a network, and wherein said method is executed by said image forming apparatus and comprises:
a system configuration registration step of registering identification information for identifying said sheet processing apparatuses and registering arrangement information regarding an order in which said image forming apparatus and said sheet processing apparatuses are arranged in the serial arrangement;
a storage step of storing the identification information and the arrangement information in association with each other in a storage unit;
a control step of sending commands to said sheet processing apparatuses based on the identification information and the arrangement information stored in said storage unit; and
a system configuration changing step of changing the arrangement information corresponding to the identification information in accordance with an indication by an operator
wherein said control step includes determining that a sheet processing apparatus that is identified by the identification information and that has yet to be powered is an unavailable apparatus,
wherein, in the case where said sheet processing apparatus yet to be powered on is located downstream of the image forming apparatus, said control step includes determining that a sheet processing apparatus that is (a) identified by the identification information, (b) determined to be powered on, and (c) located downstream of said sheet processing apparatus yet to be powered on is an unavailable apparatus, and
wherein in the case where said sheet processing apparatus yet to be powered on is located upstream of the image forming apparatus, said control step includes determining that a sheet processing apparatus that is (a) identified by the identification information, (b) located downstream of said apparatus, and (c) has yet to be powered on is an available apparatus.

17. An image forming apparatus located in a serial arrangement in which the image forming apparatus and a plurality of sheet processing apparatuses are serially attached, the image forming apparatus and the sheet processing apparatuses being connected to a network, said image forming apparatus comprising:
a system configuration registration unit that registers identification information for identifying said sheet processing apparatuses and registers arrangement information regarding an order in which said image forming apparatus and said sheet processing apparatuses are arranged in the serial arrangement;
a storage unit that stores the identification information and the arrangement information in association with each other; and
a control unit that sends commands to said sheet processing apparatuses based on the identification information and the arrangement information stored in said storage unit,
wherein said system configuration registration unit changes the arrangement information corresponding to the identification information in accordance with an indication by an operator,
wherein said control unit determines that a sheet processing apparatus that is identified by the identification information and that has yet to be powered on is an unavailable apparatus,
wherein, in the case where said sheet processing apparatus yet to be powered on is located downstream of the image forming apparatus, said control unit determines that a sheet processing apparatus that is (a) identified by the identification information, (b) determined to be powered on, and (c) located downstream of said sheet processing apparatus yet to be powered on is an unavailable apparatus, and
wherein in the case where said sheet processing apparatus yet to be powered on is located upstream of the image forming apparatus, said control unit determines that a sheet processing apparatus that is (a) identified by the identification information, (b) located downstream of said apparatus, and (c) has yet to be powered on is an available apparatus.

* * * * *

UNITED STATES PATENT AND TRADEMARK OFFICE
CERTIFICATE OF CORRECTION

| | |
|---|---|
| PATENT NO. | : 7,843,584 B2 |
| APPLICATION NO. | : 11/469744 |
| DATED | : November 30, 2010 |
| INVENTOR(S) | : Nishikata |

Page 1 of 1

It is certified that error appears in the above-identified patent and that said Letters Patent is hereby corrected as shown below:

Title Page,
In item (56) References Cited, Other Publications

INSERT --Office action issued in corresponding Japanese Patent Application No. 2005-258309 dated December 4, 2009, which corresponds to related US publication S.N. 2007-0053700 (US Patent no. 7,715,735--

Signed and Sealed this
Twenty-second Day of February, 2011

David J. Kappos
*Director of the United States Patent and Trademark Office*